(12) United States Patent
Frantzen et al.

(10) Patent No.: US 9,381,781 B2
(45) Date of Patent: Jul. 5, 2016

(54) BONDING TO A PNEUMATIC TIRE

(71) Applicant: The Goodyear Tire & Rubber Company, Akron, OH (US)

(72) Inventors: Andreas Frantzen, Trier (DE); Giorgio Agostini, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 24 days.

(21) Appl. No.: 14/626,656

(22) Filed: Feb. 19, 2015

(65) Prior Publication Data

US 2015/0158343 A1 Jun. 11, 2015

Related U.S. Application Data

(63) Continuation-in-part of application No. 13/561,155, filed on Jul. 30, 2012, now abandoned.

(51) Int. Cl.
*B60C 23/12* (2006.01)
(52) U.S. Cl.
CPC ......... *B60C 23/12* (2013.01); *Y10T 152/10495* (2015.01)
(58) Field of Classification Search
CPC ..... B60C 23/12; B60C 19/00; B29D 30/0061
See application file for complete search history.

(56) References Cited

U.S. PATENT DOCUMENTS

| 3,304,981 | A | | 2/1967 | Sheppard |
| 4,399,854 | A | * | 8/1983 | DiRocco ............... B29C 73/10 152/367 |
| 4,673,014 | A | | 6/1987 | Markow |
| 6,039,826 | A | | 3/2000 | Okada |
| 6,460,586 | B1 | | 10/2002 | Spragg et al. |
| 6,701,987 | B1 | | 3/2004 | Abbott |
| 6,843,293 | B1 | | 1/2005 | Corvasce et al. |
| 7,093,629 | B2 | | 8/2006 | Tanaka et al. |
| 7,462,391 | B2 | | 12/2008 | Puhala et al. |
| 7,513,281 | B2 | | 4/2009 | Ikeda et al. |
| 7,628,190 | B2 | | 12/2009 | Takahashi et al. |
| 8,534,335 | B2 | | 9/2013 | Benedict |
| 2006/0283534 | A1 | | 12/2006 | Hawes |
| 2008/0047647 | A1 | | 2/2008 | Raskas |
| 2009/0044891 | A1 | | 2/2009 | Lee |
| 2010/0032066 | A1 | | 2/2010 | Nakao et al. |
| 2012/0125504 | A1 | | 5/2012 | Delgado et al. |
| 2014/0027032 | A1 | | 1/2014 | Frantzen et al. |

FOREIGN PATENT DOCUMENTS

| CN | 1111575 A | 11/1995 |
| EP | 1671817 A2 | 6/2006 |
| EP | 2433822 A1 | 3/2012 |
| EP | 2455239 A1 | 5/2012 |
| WO | 2007134556 | 11/2007 |
| WO | 2010110905 | 9/2010 |

* cited by examiner

*Primary Examiner* — Kip T Kotter
(74) *Attorney, Agent, or Firm* — Robert N. Lipcsik

(57) ABSTRACT

A pneumatic tire assembly includes: a tire having a pneumatic cavity; a rigid structure for facilitating operation of the tire assembly, the rigid structure being bonded to the tire by a layered thermoplastic material such that a stiffness gradient is created between the structure and the tire; first and second sidewalls extending respectively from first and second tire bead regions to a tire tread region, the first sidewall having at least one bending region operatively bending when radially within a rolling tire footprint; and a sidewall groove defined by groove walls positioned within the bending region of the first tire sidewall, the sidewall groove deforming segment by segment between a non-deformed state and a deformed, constricted state in response to bending of the bending region of the first sidewall while radially within the rolling tire footprint.

14 Claims, 24 Drawing Sheets

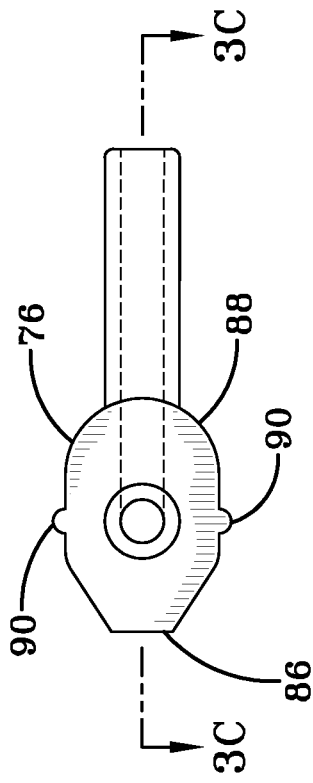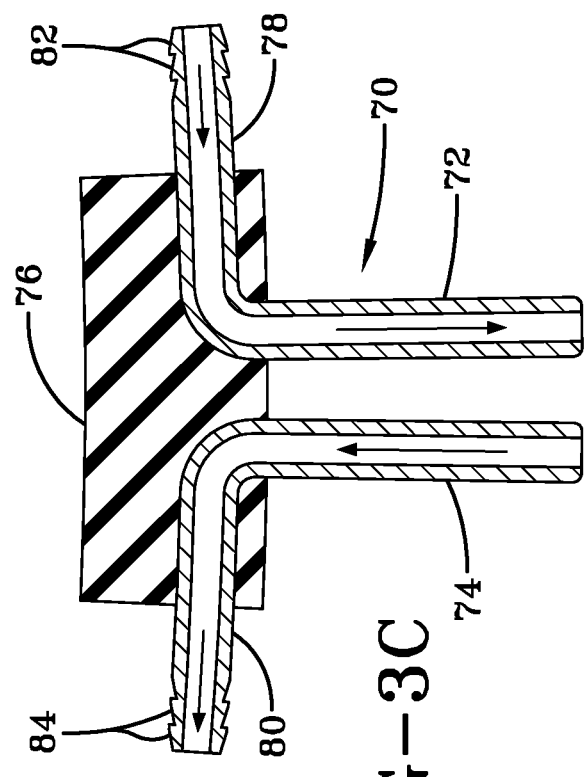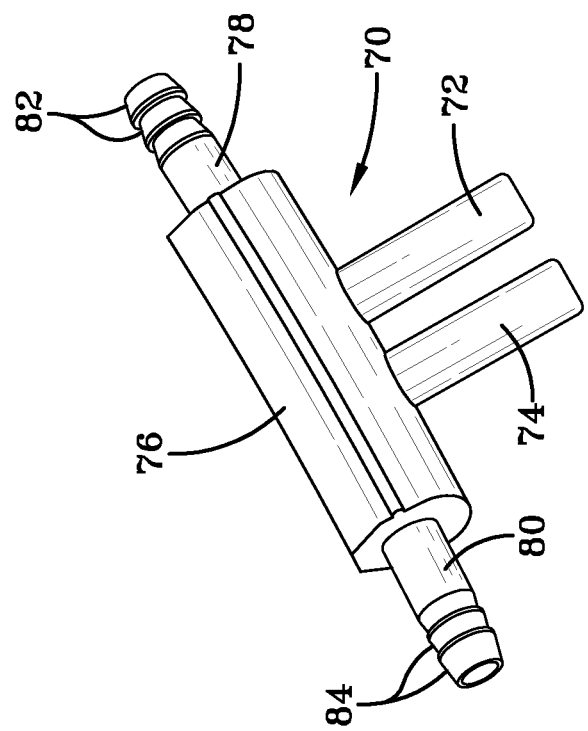

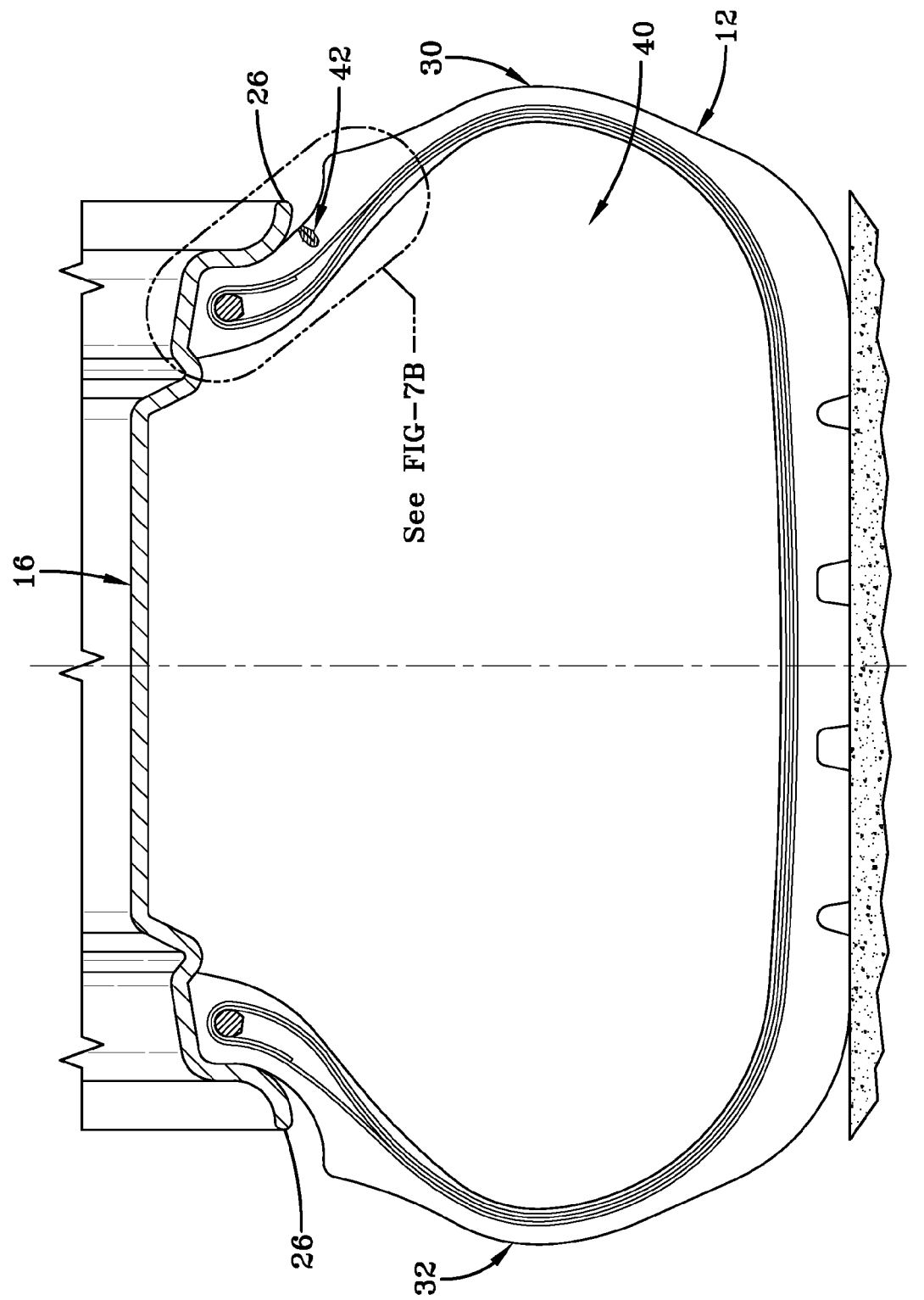

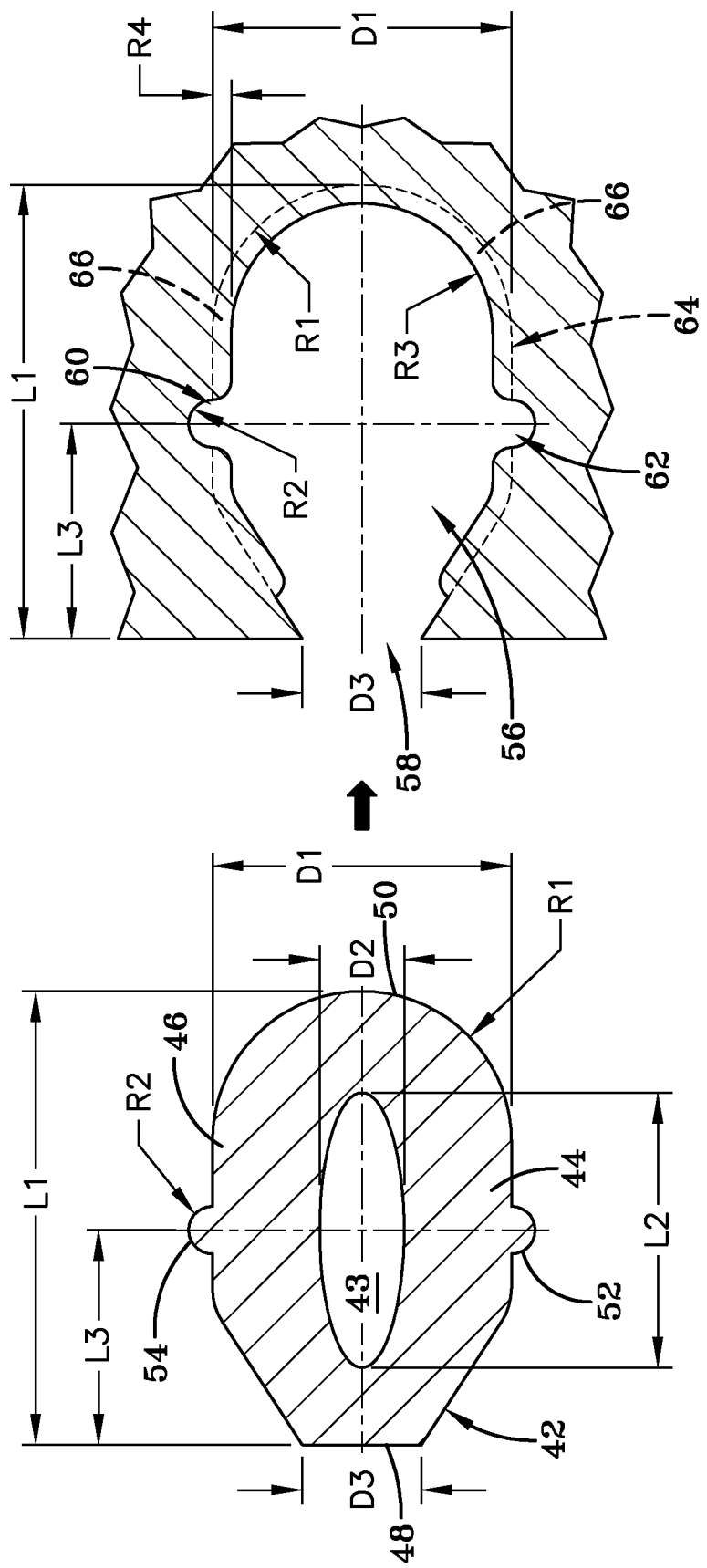

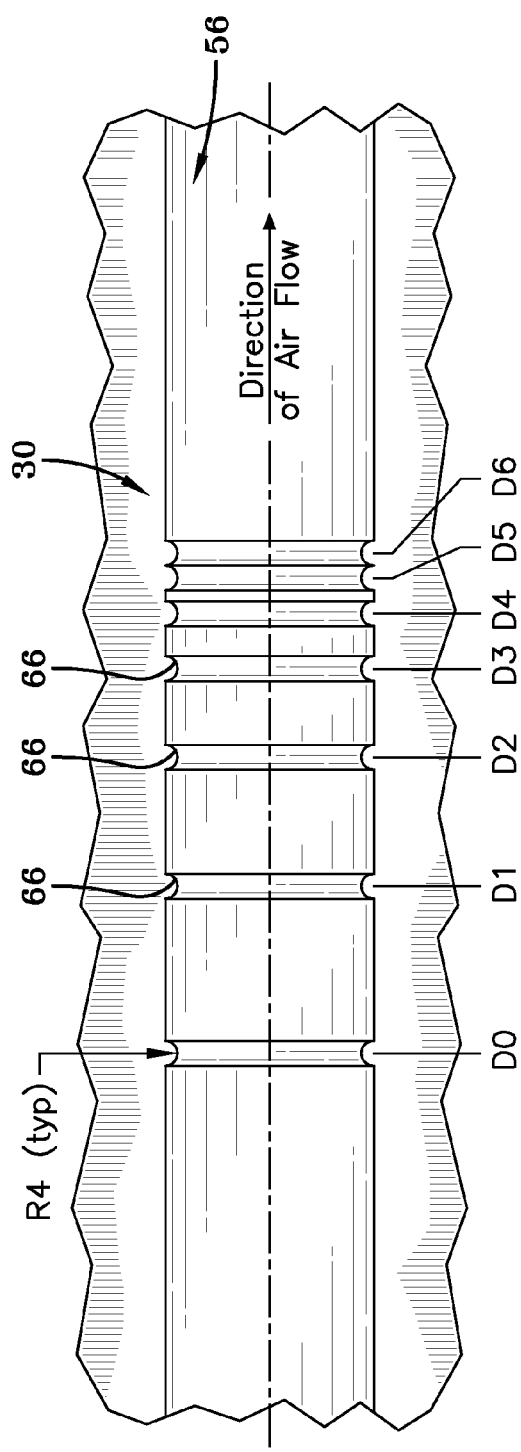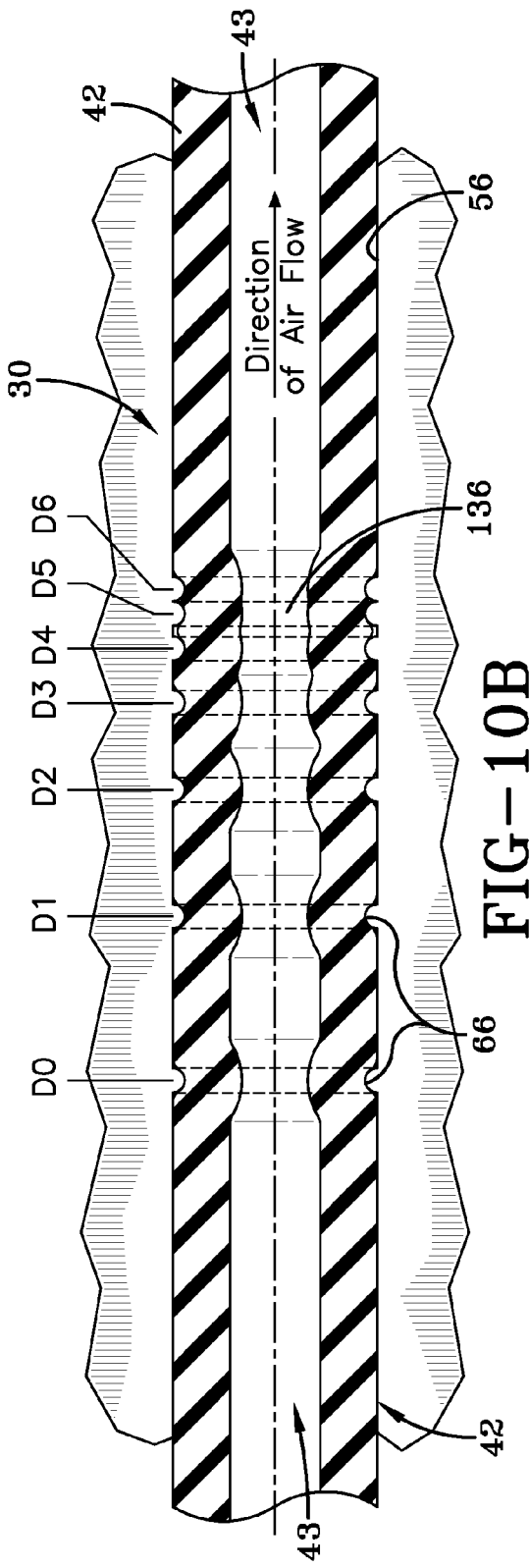

BONDING TO A PNEUMATIC TIRE

FIELD OF THE INVENTION

The invention relates generally to bonding parts to a pneumatic tire and, more specifically, to bonding parts of a pumping assembly to a pneumatic tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will maintain air pressure within the tire in order to compensate for any reduction in tire pressure over time without the need for driver intervention.

SUMMARY OF THE INVENTION

In one form of the present invention, a pneumatic tire assembly comprises: a tire having a pneumatic cavity; a rigid structure for facilitating operation of the tire assembly, the rigid structure being bonded to the tire by a layered thermoplastic material such that a stiffness gradient is created between the structure and the tire; first and second sidewalls extending respectively from first and second tire bead regions to a tire tread region, the first sidewall having at least one bending region operatively bending when radially within a rolling tire footprint; and a sidewall groove defined by groove walls positioned within the bending region of the first tire sidewall, the sidewall groove deforming segment by segment between a non-deformed state and a deformed, constricted state in response to bending of the bending region of the first sidewall while radially within the rolling tire footprint. An air passageway is defined by the sidewall groove and deforms segment by segment between an expanded condition and an at least partially collapsed condition in response to respective segment by segment deformation of the sidewall groove when radially within the rolling tire footprint.

According to another aspect of the pneumatic tire assembly, the thermoplastic material is selected from the group consisting of polyethylene, polypropylene, polyamide, polyester, polyphenylene ether, and polyphthalamide.

According to still another aspect of the pneumatic tire assembly, the thermoplastic material is polyethylene.

According to yet another aspect of the pneumatic tire assembly, the rigid structure further comprises an adhesive selected from the group consisting of an RFL adhesive and an epoxy-based adhesive.

According to still another aspect of the pneumatic tire assembly, the thermoplastic material comprises a plurality of thermoplastic layers.

According to yet another aspect of the pneumatic tire assembly, the thermoplastic material comprises a plurality of thermoplastic layers wherein the thermoplastic layers have a layer thickness ranging from 0.1 to 1 mm.

According to still another aspect of the pneumatic tire assembly, the thermoplastic material comprises at least ten thermoplastic layers.

According to yet another aspect of the pneumatic tire assembly, the thermoplastic material comprises a plurality of thermoplastic layers with an adhesive disposed between the thermoplastic layers.

According to still another aspect of the pneumatic tire assembly, the thermoplastic material comprises at least ten thermoplastic layers with an adhesive disposed between the thermoplastic layers.

According to yet another aspect of the pneumatic tire assembly, the rigid structure is constructed of ultra high molecular weight polyethylene.

According to still another aspect of the pneumatic tire assembly, the rigid structure and the tire define a built-in tube-like cavity.

According to yet another aspect of the pneumatic tire assembly, the rigid structure and the tire reroute pressurized air to a pump assembly, and from there, into the pneumatic cavity.

According to still another aspect of the pneumatic tire assembly, a separate tube is disposed within the sidewall groove, the separate tube defining a circular air passageway.

According to yet another aspect of the pneumatic tire assembly, the separate tube has an outer profile corresponding to an inner profile of the sidewall groove.

According to still another aspect of the pneumatic tire assembly, the rigid structure comprises a plurality of check valves disposed at multiple arcuate positions about the sidewall groove.

According to yet another aspect of the pneumatic tire assembly, the rigid structure and the tire define a built-in tube-like cavity; and the rigid structure and the tire reroute pressurized air to a pump assembly, and from there, into the pneumatic cavity.

According to still another aspect of the pneumatic tire assembly, a subcoat is applied to a bare surface of the rigid structure; and a topcoat applied to the subcoat.

According to yet another aspect of the pneumatic tire assembly, the compound cement is applied to the topcoat.

According to still another aspect of the pneumatic tire assembly, the subcoat is dried to the bare surface of the rigid structure at 180 C for 8 min.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in section for receipt of a an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape with adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 3A-3C; Details of an example outlet connector.

FIG. 7A; Section view taken from FIG. 5A.

FIG. 8A; Enlarged detail of an example tube & groove detail taken from FIG. 2.

FIG. 10A; Enlarged detail of the groove with the example rib profile.

FIG. 10B; Enlarged detail of tube pressed into the example rib profile.

DETAILED DESCRIPTION OF EXAMPLES OF THE PRESENT INVENTION

Figure 2:
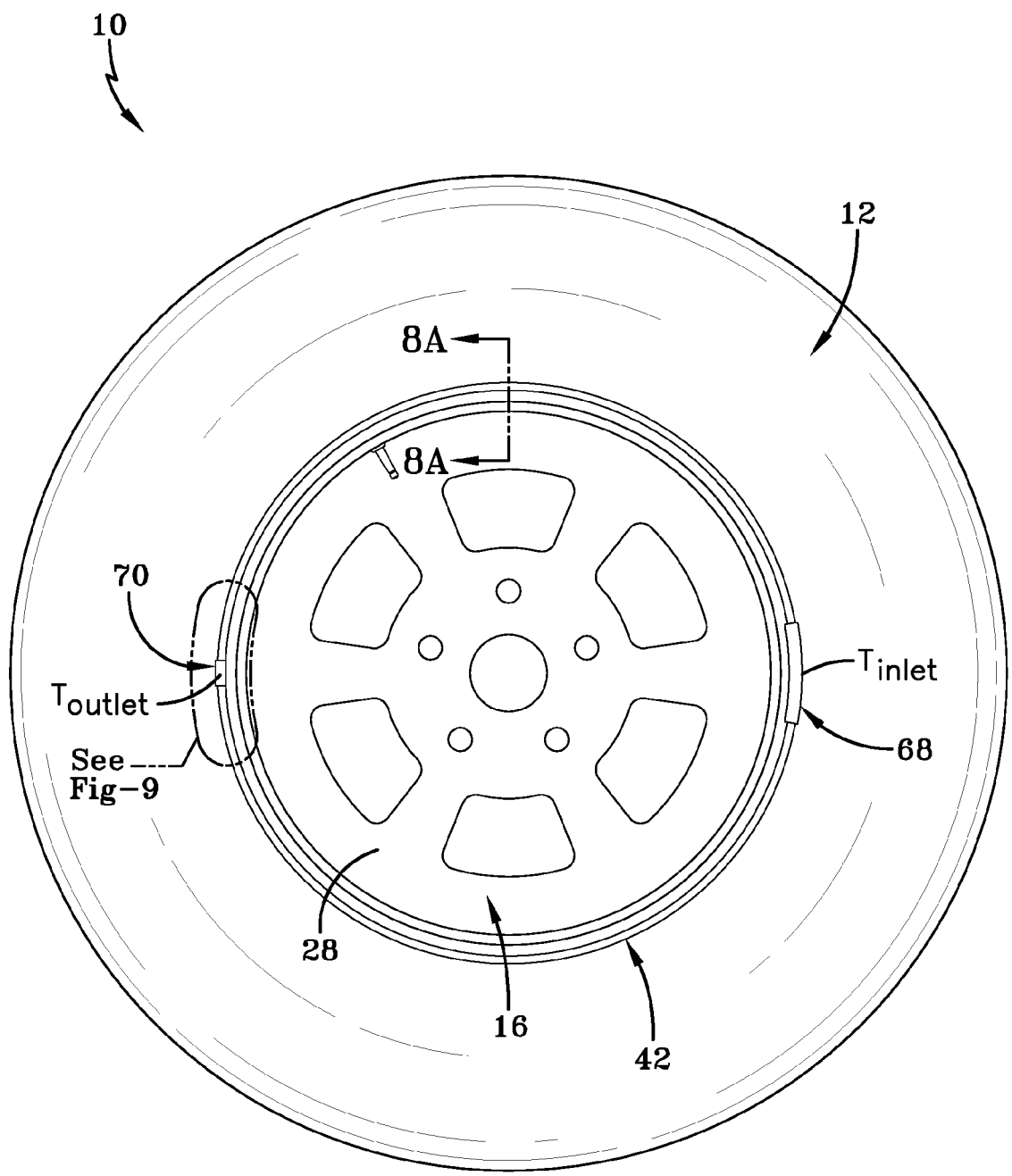
FIG. 2; Side view of the example tire/tube assembly.
Figure 4A:
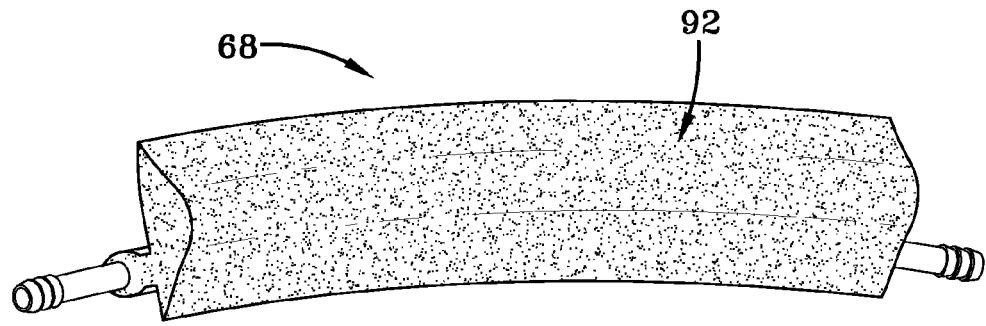
FIG. 4A-4E; Details of an example inlet (filter) connector.
Figure 4B:
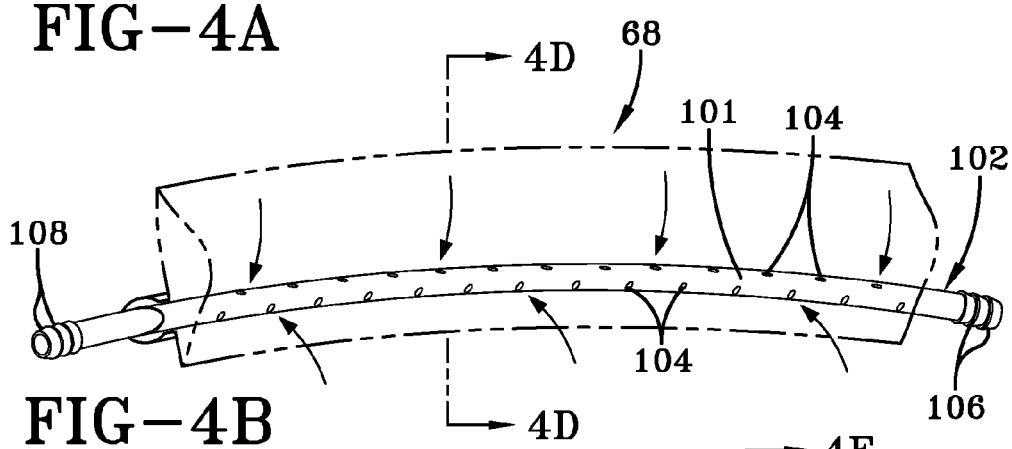
Figure 4C:
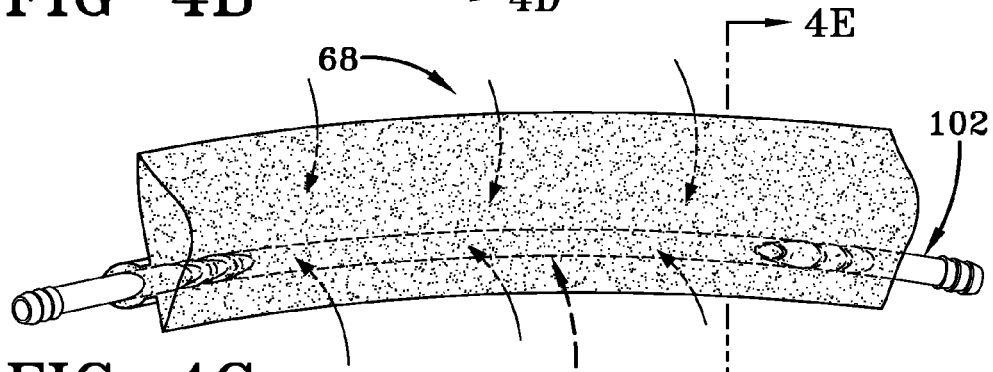
Figure 4D:
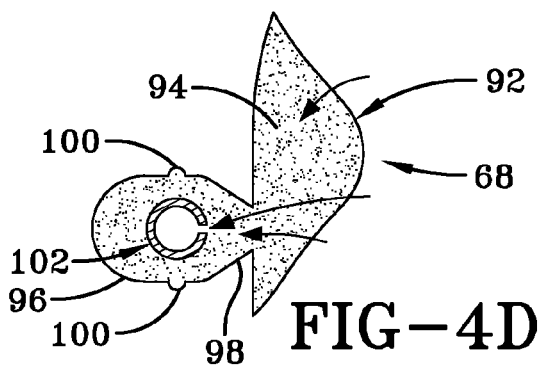
Figure 4E:
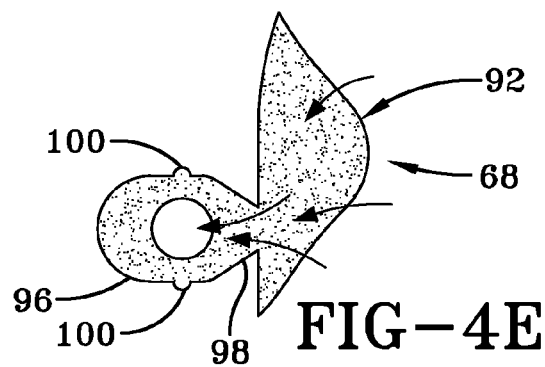
Figure 6A:
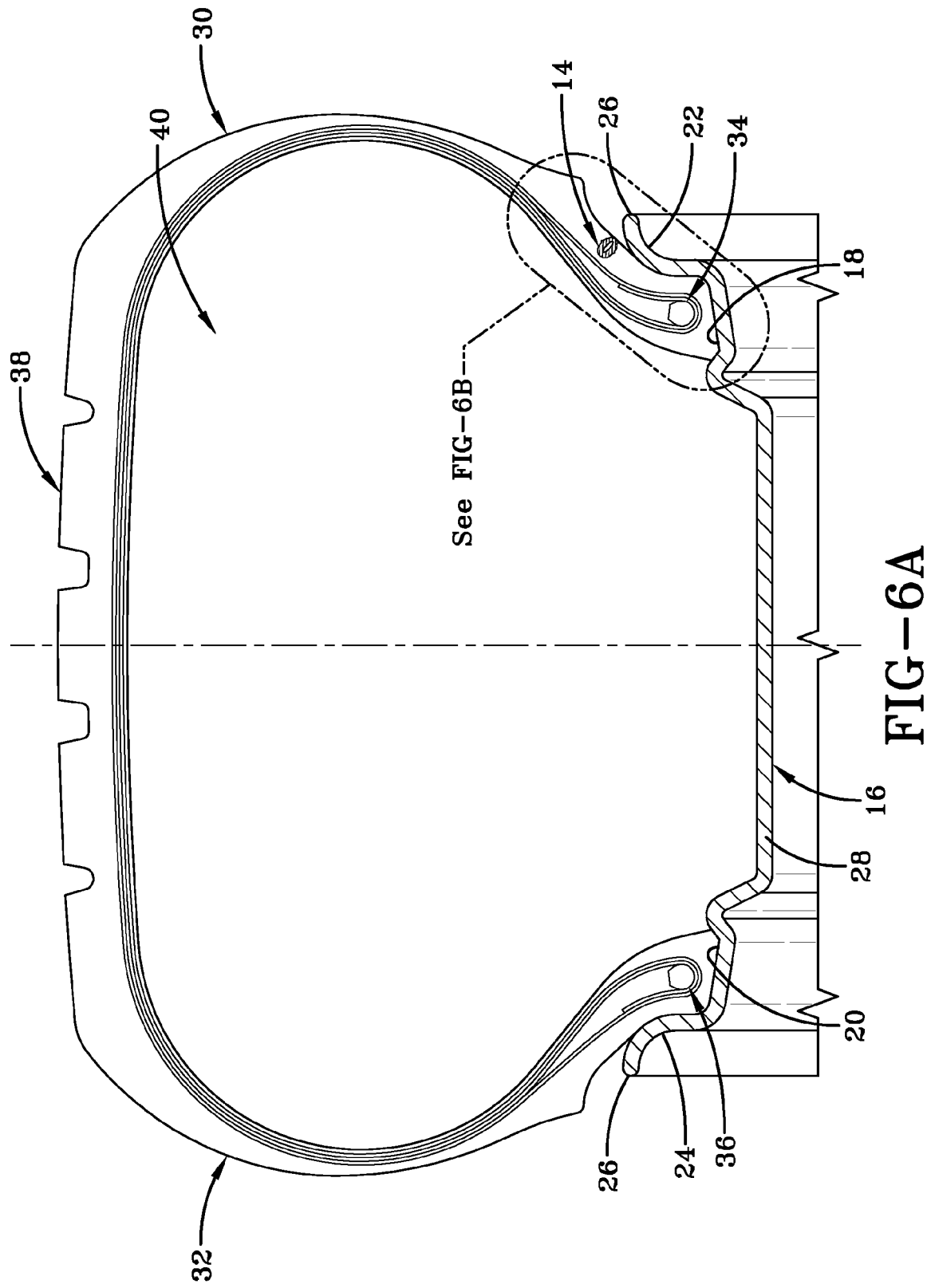
FIG. 6A; Section view taken from FIG. 5A.
Figure 16:
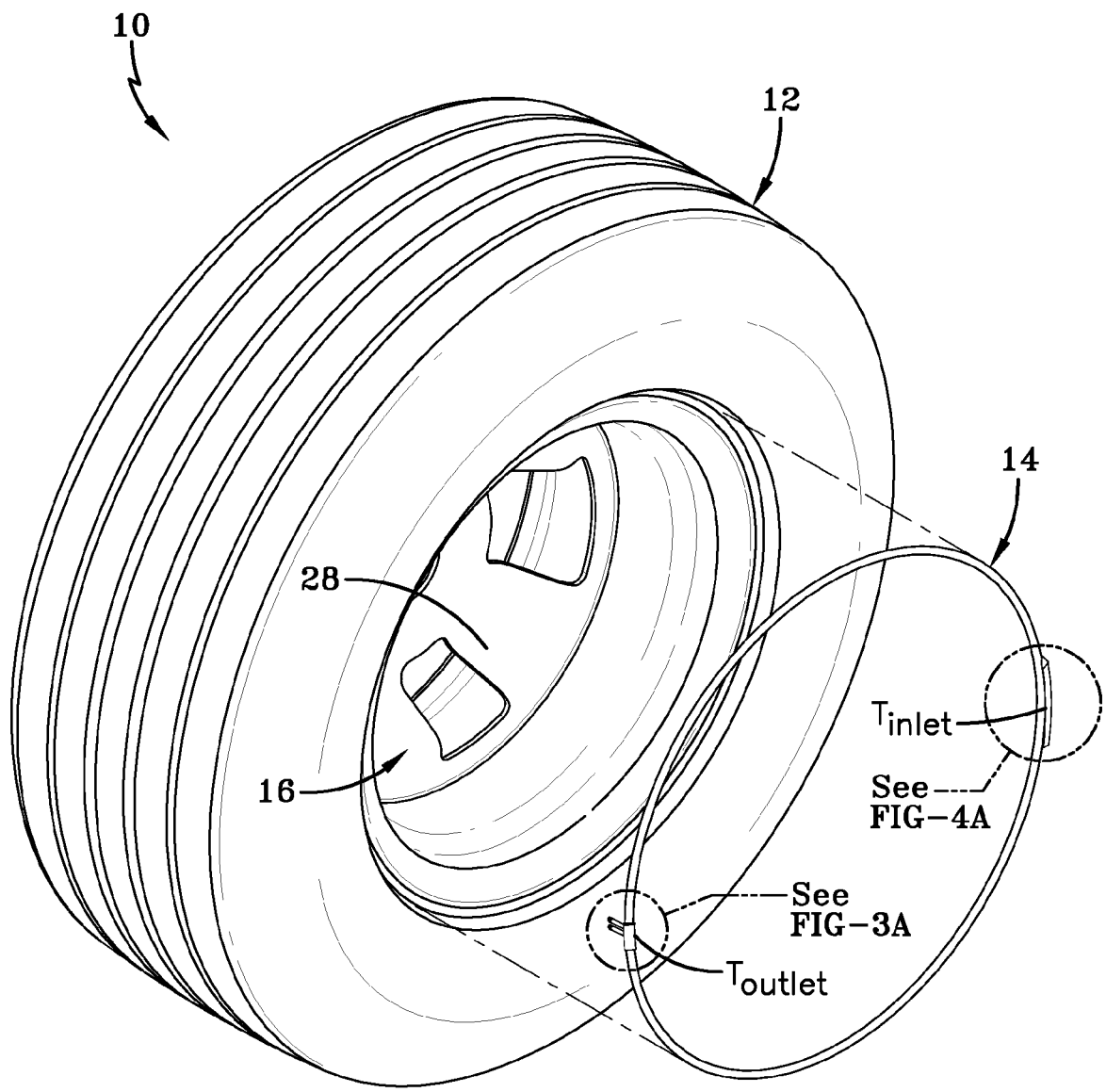
FIG. 16; Isometric exploded view of an example tire and tube assembly for use with the present invention.

Referring to FIGS. 16, 2, and 6A, an example tire assembly 10 may include a tire 12, a peristaltic pump assembly 14, and a tire rim 16. The tire may mount in conventional fashion to a pair of rim mounting surfaces 18, 20 adjacent outer rim flanges 22, 24. The rim flanges 22, 24 each have a radially outward facing flange end 26. A rim body 28 may support the tire assembly 10 as shown. The tire 12 may be of conventional construction, having a pair of sidewalls 30, 32 extending from opposite bead areas 34, 36 to a crown or tire tread region 38. The tire 12 and rim 16 may enclose a tire cavity 40.

As seen from FIGS. 2 and 3A, 3B, 3C, 6B and 8A, the example peristaltic pump assembly 14 may include an annular air tube 42 that encloses an annular passageway 43. The tube 42 may be formed of a resilient, flexible material such as plastic or rubber compounds that are capable of withstanding repeated deformation cycles of a flattened condition subject to external force and, upon removal of such force, returned to an original condition generally circular in cross-section. The tube 42 may have a diameter sufficient to operatively pass a volume of air for purposes described herein and allowing a positioning of the tube in an operable location within the tire assembly 10 as will be described below. In the example configuration shown, the tube 42 may be an elongate, generally elliptical shape in cross-section, having opposite tube sidewalls 44, 46 extending from a flat (closed) trailing tube end 48 to a radiussed (open) leading tube end 50. The tube 42 may have a longitudinal outwardly projecting pair of locking detent ribs 52 of generally semi-circular cross-section and each rib extending along outward surfaces of the sidewalls 44, 46, respectively.

As referenced in FIG. 8A, the tube 42 may have a length L1 within a range of 3.65 mm to 3.80 mm; a width of D1 within a range of 2.2 mm to 3.8 mm; a trailing end width of D3 within a range of 0.8 mm to 1.0 mm. The protruding detent ribs 52, 54 may each have a radius of curvature R2 within a range of 0.2 mm to 0.5 mm and each rib may be located at a position distance L3 within a range of 1.8 mm to 2.0 mm of the trailing tube end 48. The leading end 50 of the tube 42 may have a radius R1 within a range of 1.1 mm to 1.9 mm. The air passageway 43 within the tube 42 may likewise be generally elliptical with a length L2 within a range of 2.2 mm to 2.3 mm; and a width D2 within a range of 0.5 mm to 0.9 mm.

The tube 42 may be profiled and geometrically configured for insertion into a groove 56. The groove 56 may have an elongate, generally elliptical configuration with a length L1 within a range of 3.65 mm to 3.80 mm complementary to the elliptical shape of the tube 42. The groove 56 may include a restricted narrower entryway 58 having a nominal cross-sectional width D3 within a range of 0.8 mm to 1.0 mm. A pair of groove-rib receiving axial detent channels 60, 62 of semi-circular configuration may be formed within opposite sides of the groove 56 for corresponding receipt of the tube locking ribs 52, 54, respectively. The channels 60, 62 may be spaced approximately a distance L3 within a range of 1.8 mm to 2.0 mm of the groove entryway 58. Detent channels 60, 62 may each have a radius of curvature R2 within a range of 0.2 mm to 0.5 mm. An inward detent groove portion 64 may be formed with a radius of curvature R1 within a range of 1.1 mm to 1.9 mm and a cross-sectional nominal width D1 within a range of 2.2 mm to 3.8 mm.

Figure 8B:
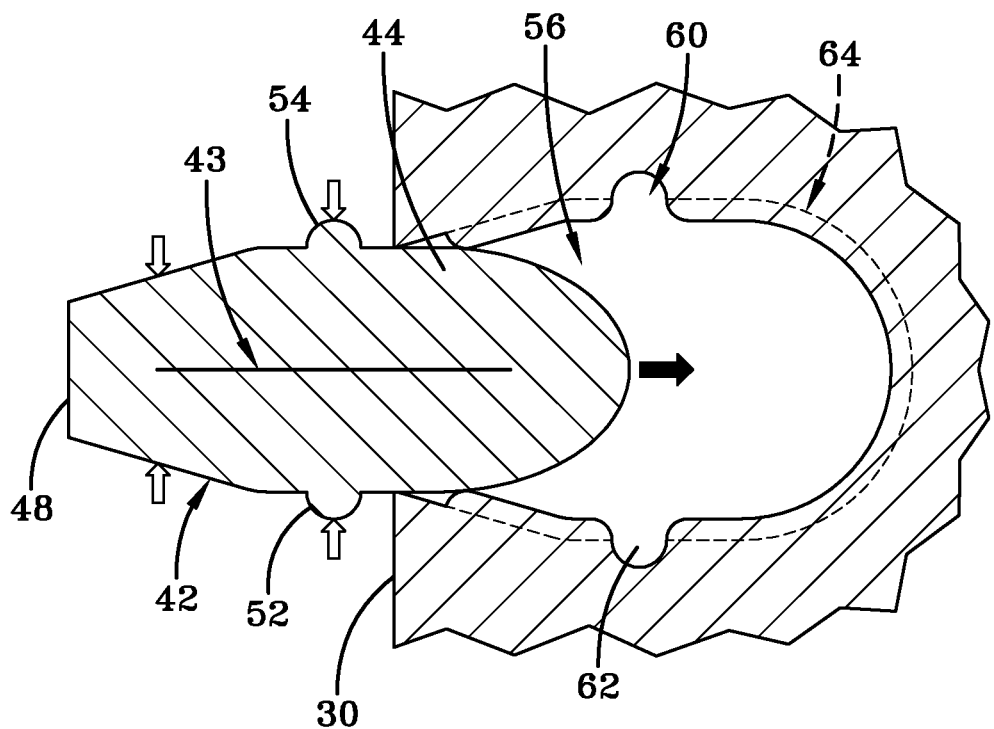
FIG. 8B; Detail showing an example tube compressed and being inserted into the groove.
Figure 8C:
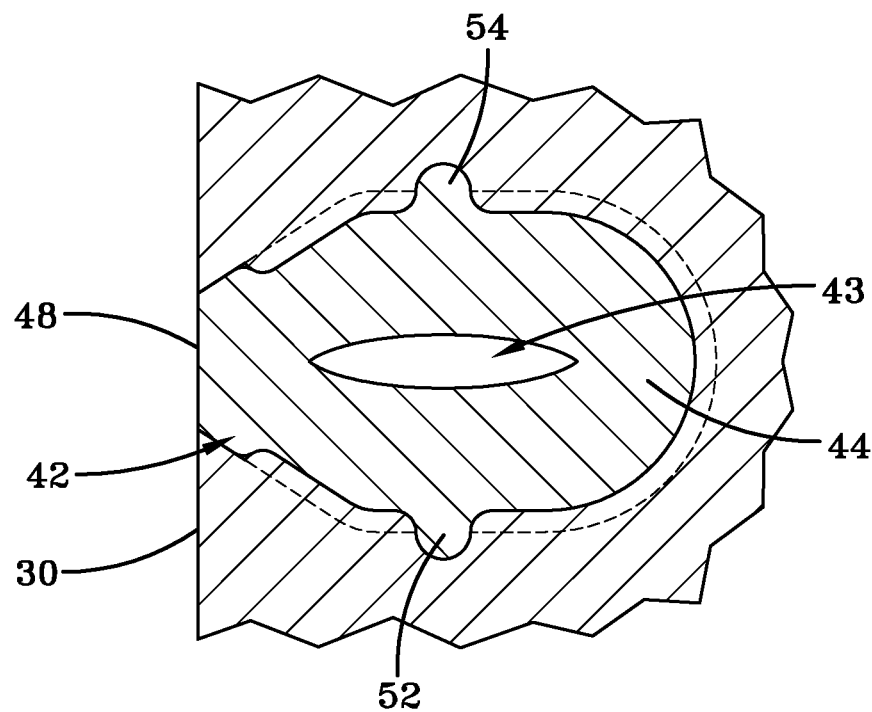
FIG. 8C; Detail showing an example tube fully inserted into the groove at a ribbed area of the groove.
Figure 8D:
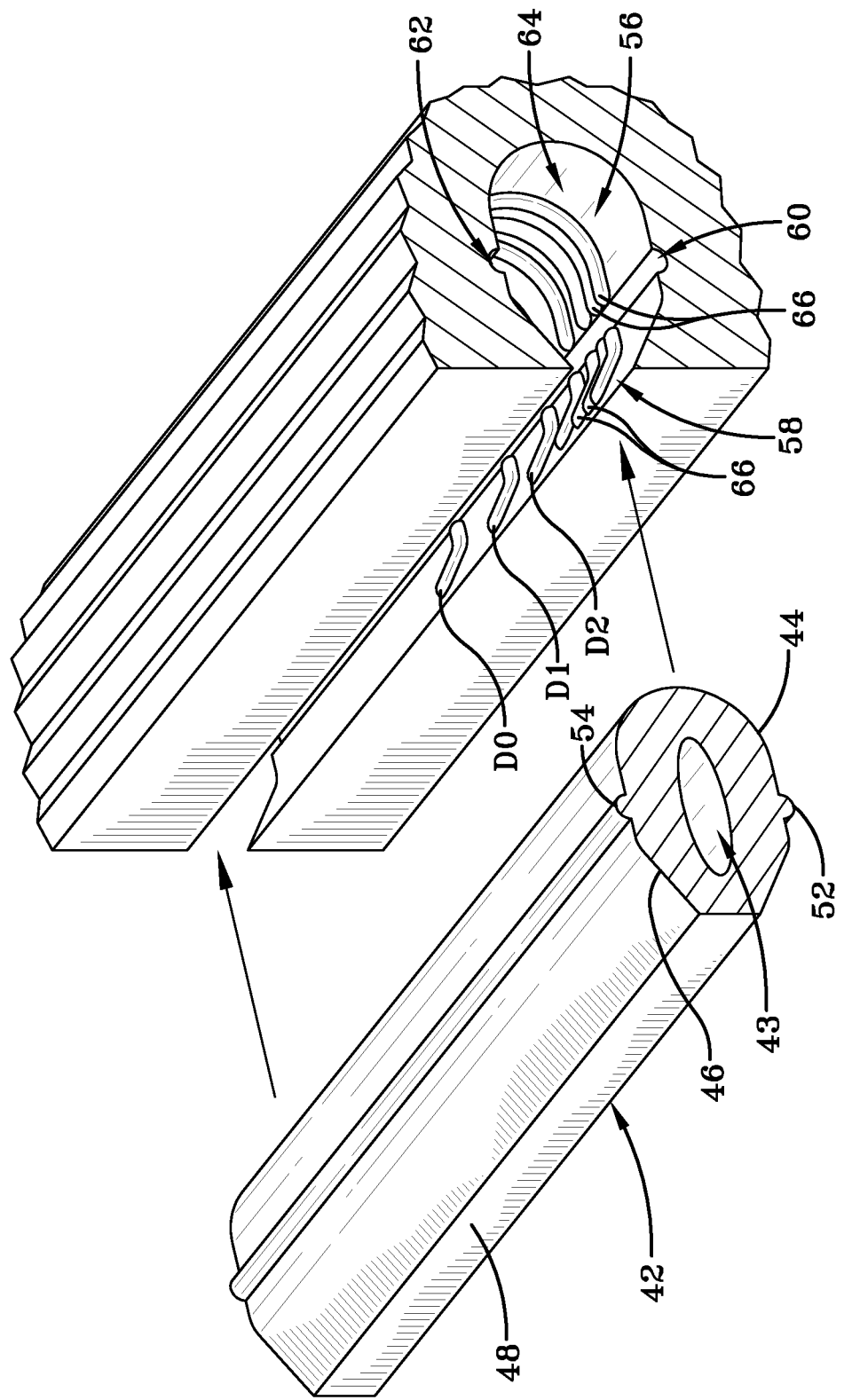
FIG. 8D; Exploded fragmented view of tube being inserted into a ribbed groove.

As best seen from FIGS. 8D, 9, 10A and 10B, the tire 12 may further form one or more compression ribs 66 extending the circumference of, and projecting into, the groove 56. The ribs 66 may form a pattern of ribs of prescribed pitch, frequency, and location, as described below. For the purpose of explanation, seven compression ribs may be referred to generally by numeral 66 in the first rib profile pattern shown, and specifically by the rib designations D0 through D6. The ribs D0 through D6 may be formed in a sequence and pitch pattern in order to optimize the pumping of air through the tube passageway 43. The ribs 66 may each have a unique and predetermined height and placement within the pattern and, as shown in FIG. 8D, project outward into the groove 56 at a radius R3 (FIG. 8A) within a range of 0.95 mm to 1.60 mm.

With reference to FIGS. 16, 2, 3A through 3C, and 4A through E, the peristaltic pump assembly 14 may further include an inlet device 68 and an outlet device 70 spaced apart approximately 180 degrees at respective locations along the circumferential air tube 42. The example outlet device 70 has a T-shaped configuration in which conduits 72, 74 direct air to, and from, the tire cavity 40. An outlet device housing 76 contains conduit arms 78, 80 that integrally extend from respective conduits 72, 74. Each of the conduit arms 78, 80 have external coupling ribs 82, 84 for retaining the conduits within disconnected ends of the air tube 42 in the assembled condition. The housing 76 is formed having an external geometry that complements the groove 56 and includes a flat end 86, a radiused generally oblong body 88, and outwardly projecting longitudinal detent ribs 90. The housing 76 may thus be capable of close receipt into the groove 56 at its intended location with the ribs 90 registering within the groove 56 as represented in FIG. 8A.

The inlet device 68, as seen in FIGS. 12A, 12B, 4A through 4E, may include an elongate outward sleeve body 94 joining an elongate inward sleeve body 96 at a narrow sleeve neck 98. The outward sleeve body is generally triangular in section. The inward sleeve body 96 has an oblong external geometry complementary to the groove 56 and includes a pair of detent ribs 100 extending longitudinally along the inward sleeve body. An elongate air entry tube 101 is positioned within the inward sleeve body 96 and includes opposite tube ends 102 and a pattern of entry apertures 104 extending into a central tube passageway. External ribs 106, 108 secure the tube ends 102 in the air tube 42 opposite the outlet device 70.

Figure 6B:
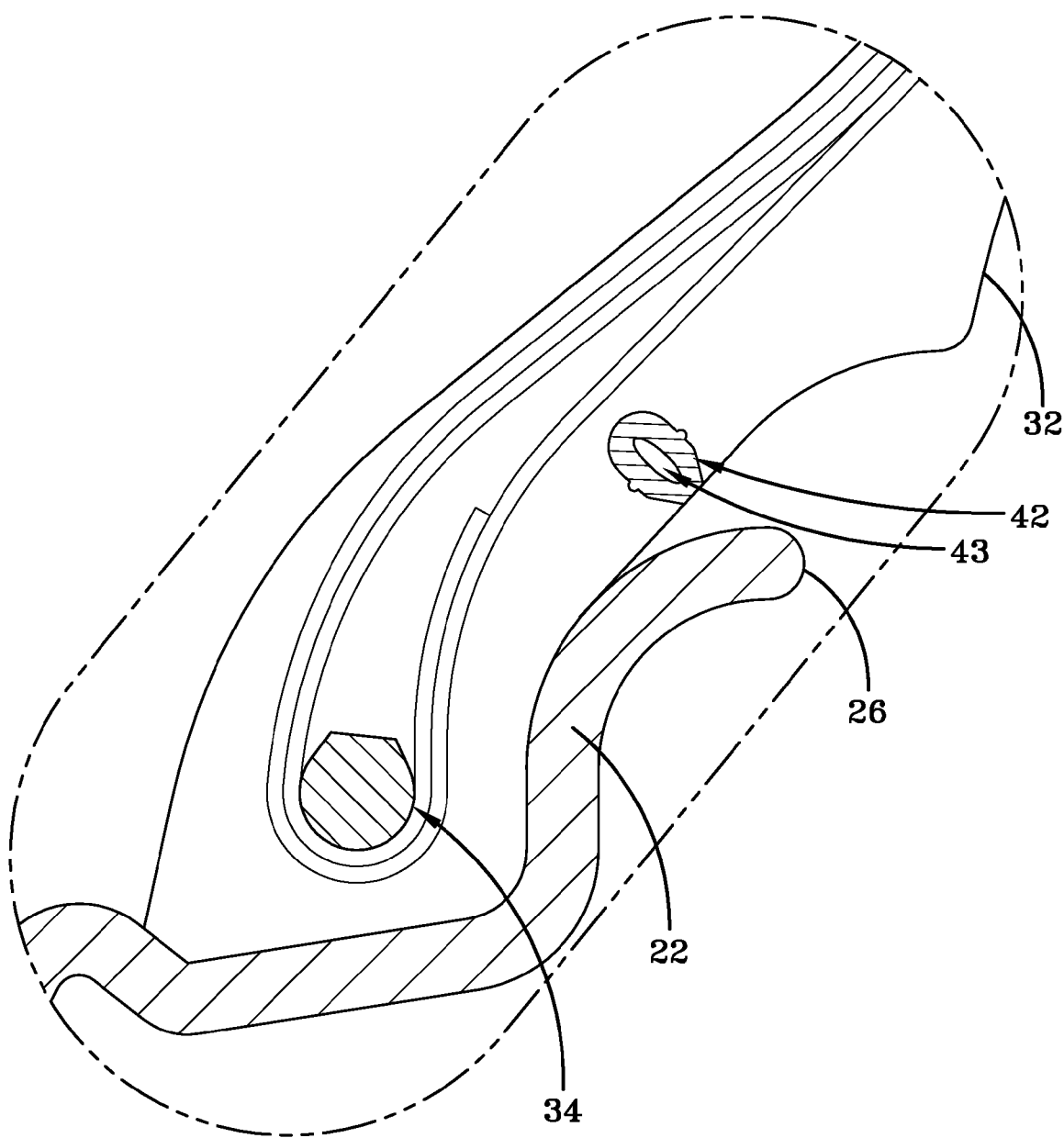
FIG. 6B; Enlarged detail of tube area taken from FIG. 6A, sidewall in non-compressed state.
Figure 7B:
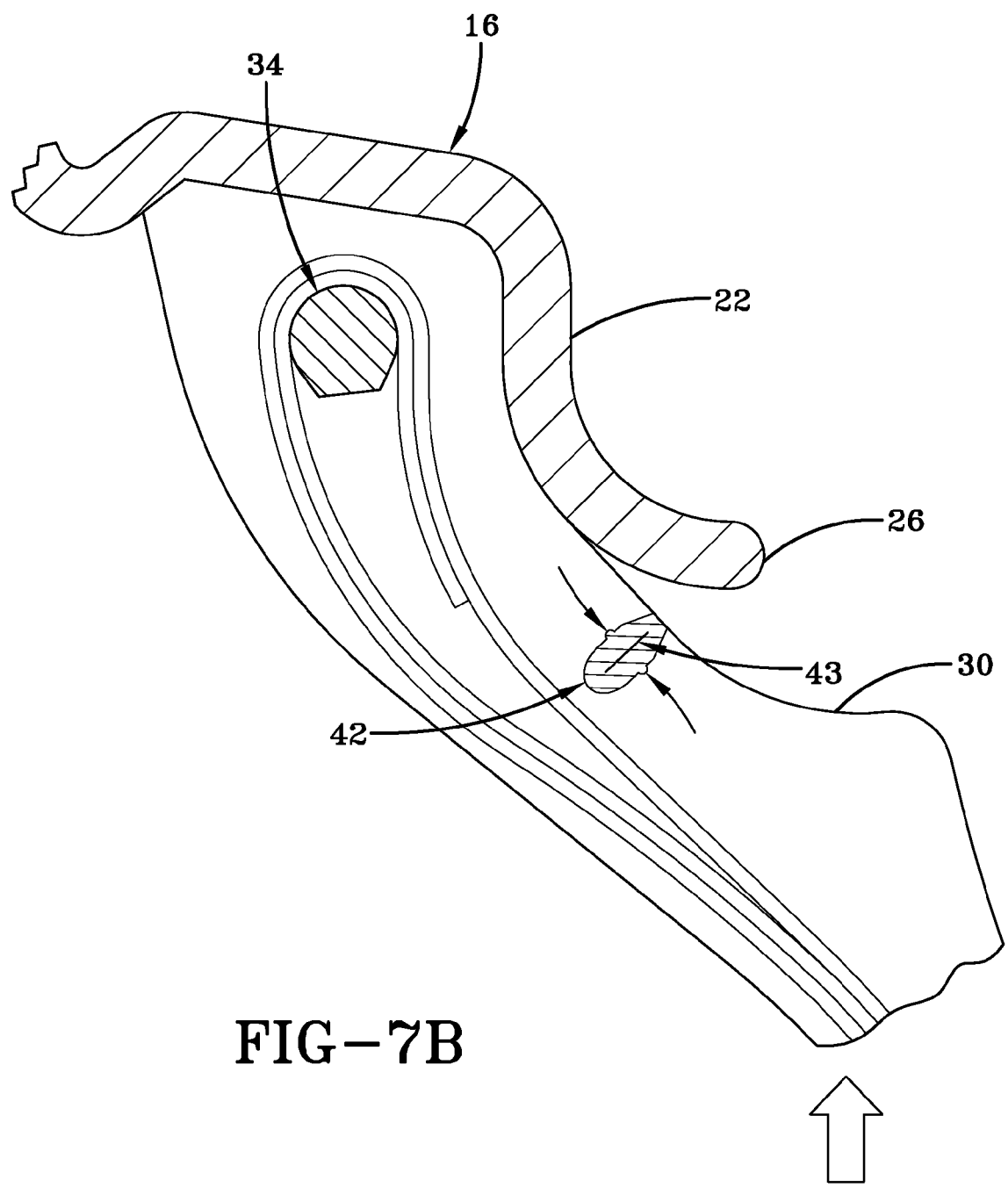
FIG. 7B; Enlarged detail of tube area taken from FIG. 7A, sidewall in compressed state.

As shown in FIGS. 6A, 6B, 7A, 7B, 8A through D, the pump assembly 14 may comprise the air tube 42 and inlet and outlet devices 68, 70 affixed in-line to the air tube at respective locations 180 degrees apart when inserted into the groove 56. The groove 56 may be located at a lower sidewall region of the tire 12 that, when the tire is mounted to the rim 16, positions the air tube 42 above the rim flange ends 26. FIG. 8B shows the air tube 42 diametrically squeezed and collapsed to accommodate insertion into the groove 56. Upon full insertion, as shown in FIG. 8C, the ribs 52, 54 may register within the groove channels 60, 62 and the flat outer end 48 of the tube 42 may be generally coplanar with the outer surface of the sidewall of the tire. Once fully inserted, the air passageway 43 of the tube 42 may elastically restore itself into an open condition to allow the flow of air along the tube during operation of the pump.

Referring to FIGS. 16, 2, 5A, 5B, 6A, 6B, 7A, 7B, 8A through 8D, the inlet device 68 and the outlet device 70 may be positioned within the circumference of the circular air tube 42 generally 180 degrees apart. The tire 12 with the tube 42 positioned within groove 56 rotates in a direction of rotation 110, causing a footprint 120 to be formed against the ground surface 118. A compressive force 124 is directed into the tire 12 from the footprint 120 and acts to flatten a segment of the air tube passageway 43 opposite the footprint 120, as shown at numeral 122. Flattening of a segment of the passageway 43 forces air from the segment along the tube passageway 43 in the direction shown by arrow 116, toward the outlet device 70.

As the tire 12 continues to rotate in the direction 110 along the ground surface 118, the tube 42 may be sequentially flattened or squeezed opposite the tire footprint, segment by segment, in a direction opposite to the direction 110. A sequential flattening of the tube passageway 43, segment by segment, may cause evacuated air from the flattened segments to be pumped in the direction 116 within tube passageway 43 toward the outlet device 70. Air may flow through the outlet device 70 and to the tire cavity 40, as shown at 130. At 130, air exiting the outlet device 70 may be routed to the tire cavity 40 and serve to re-inflate the tire 12 to a desired pressure level. A valve system to regulate the flow of air to the cavity 40, when the air pressure within the cavity falls to a prescribed level, is shown and described in U.S. Pat. No. 8,381,785, granted Feb. 26, 2013, and incorporated herein by reference.

Figure 5A:
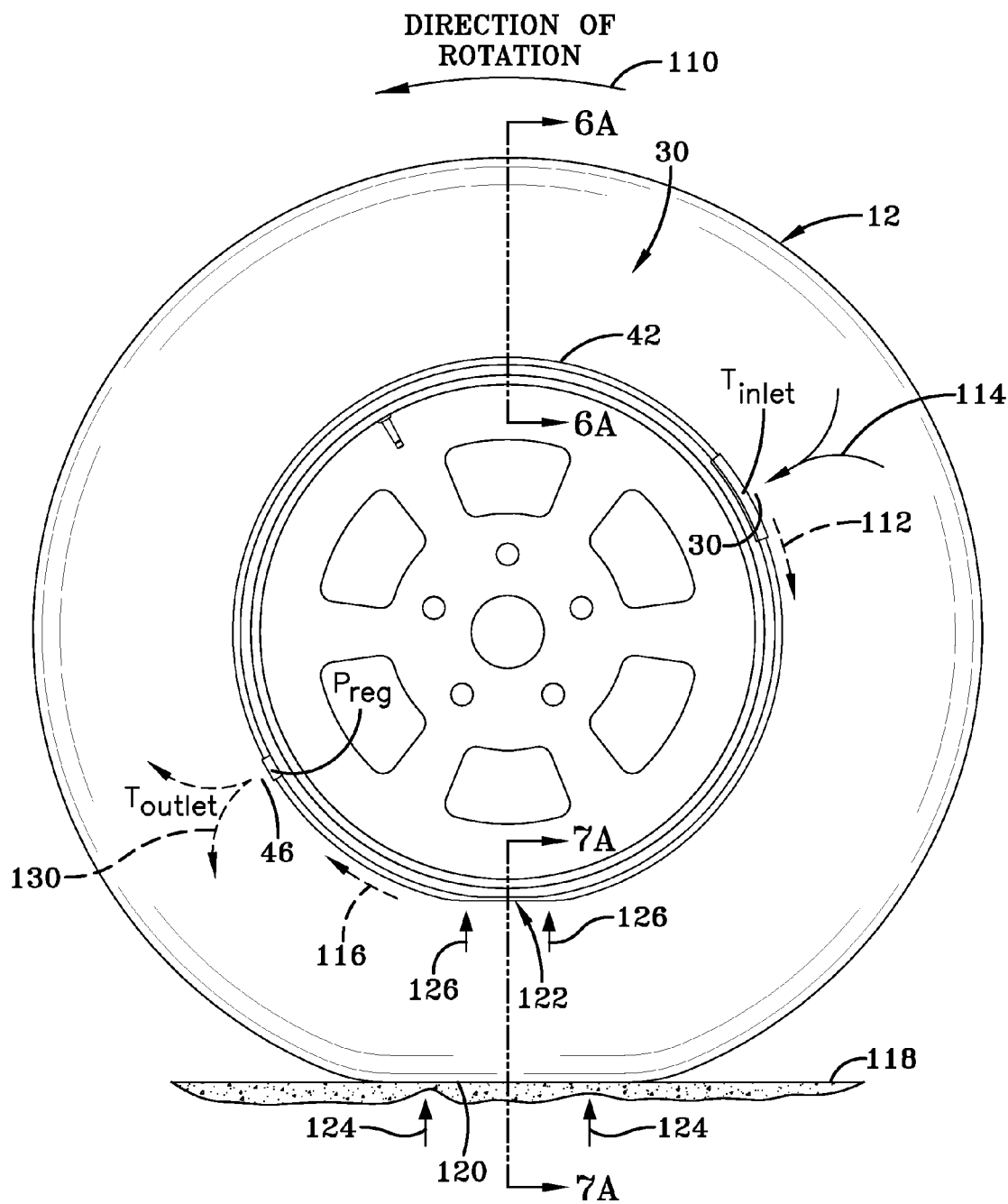
FIG. 5A; Side view of an example tire rotating with air movement (84) to cavity.
Figure 5B:
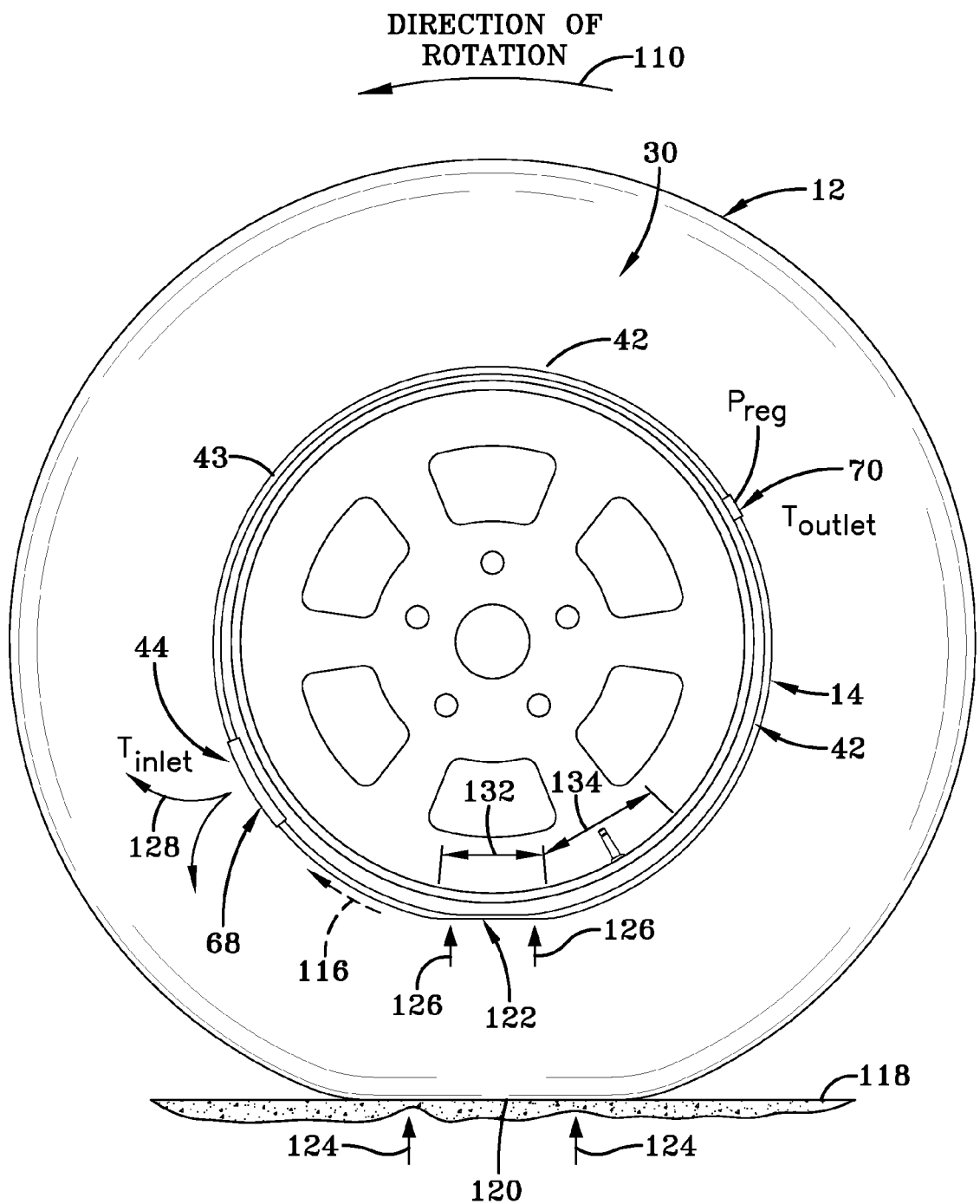
FIG. 5B; Side view of the example tire rotating with air flushing out filter.

With the tire 12 rotating in direction 110, flattened tube segments may be sequentially refilled by air flowing into the inlet device 68 in the direction 114, as shown by FIG. 5A. The inflow of air into the inlet device 68, and then into the tube passageway 43, may continue until the outlet device 70, rotating in a counterclockwise direction 110, passes the tire footprint 120. FIG. 5B shows the orientation of the peristaltic pump assembly 14 in such a position. The tube 42 may continue to be sequentially flattened, segment by segment, opposite the tire footprint 120 by a compressive force 124. Air may be pumped in the clockwise direction 116 to the inlet device 68 and evacuated or exhausted external to the tire 12.

Passage of exhaust air, as shown at 128, from the inlet device 68 may occur through a filter sleeve 92 exemplarily formed of a cellular or porous material or composite. Flow of air through the filter sleeve 92 and into the tube 101 may thus cleanse debris or particulates. In the exhaust or reverse flow of air direction 128, the filter sleeve 92 may be cleansed of trapped accumulated debris or particles within the porous medium. With the evacuation of pumped air out of the inlet device 68, the outlet device 70 may be in a closed position preventing air flow to the tire cavity 40. When the tire 12 rotates further in counterclockwise direction 110 until the inlet device 70 passes the tire footprint 120 (as shown in FIG. 5A), the airflow may resume to the outlet device and cause the pumped air to flow out and into the tire cavity 40. Air pressure within the tire cavity 40 may thus be maintained at a desired level.

FIG. 5B illustrates that the tube 42 is flattened, segment by segment, as the tire 12 rotates in direction 110. A flattened segment 134 moves counterclockwise as it is rotated away from the tire footprint 120 while an adjacent segment 132 moves opposite the tire footprint and is flattened. Accordingly, the progression of squeezed or flattened or closed tube segments may be move air toward the outlet device 70 (FIG. 5A) or the inlet device 68 (FIG. 5B) depending on the rotational position of the tire 12 relative to such devices. As each segment is moved by tire rotation away from the footprint 120, the compression forces within the tire 12 from the footprint region may be eliminated and the segment may resiliently reconfigure into an unflattened or open condition as the segment refills with air from the passageway 43. FIGS. 7A and 7B show a segment of the tube 42 in the flattened condition while FIGS. 6A and 6B show the segment in an expanded, unflat or open configuration prior to, and after, moving away from a location opposite the tire footprint 120. In the original non-flattened configuration, segments of the tube 42 may resume the exemplary oblong generally elliptical shape.

The above-described cycle may repeat for each tire revolution, with half of each rotation resulting in pumped air moving to the tire cavity 40 and half of each rotation resulting in pumped air moving back out the filter sleeve 92 of the inlet device 68 for self-cleaning the filter. It may be appreciated that while the direction of rotation 110 of the tire 12 is as shown in FIGS. 5A and 5B is counterclockwise, the subject tire assembly 10 and its peristaltic pump assembly 14 may function in a like manner in a reverse (clockwise) direction of rotation as well. The peristaltic pump assembly 14 may accordingly be bi-directional and equally functional with the tire 12 and vehicle moving in a forward or reverse direction of rotation and forward or reverse direction of the vehicle.

The air tube/pump assembly 14 may be as shown in FIGS. 5A, 5B, 6A, 6B, 7A and 7B. The tube 42 may be located within the groove 56 in a lower region of the sidewall 30 of the tire 12. The passageway 43 of the tube 42 may close by compression strain bending of the sidewall groove 56 within a rolling tire footprint 120, as explained above. The location of the tube 42 in the sidewall 30 may provide freedom of placement thereby avoiding contact between the tube 42 and the rim 16. Higher placement of the tube 42 in the sidewall groove 56 may use high deformation characteristics of this region of the sidewall as it passes through the tire footprint 120 to close the tube 42.

The configuration and operation of the grooved sidewalls, and in particular the variable pressure pump compression of the tube 42 by operation of ridges or compression ribs 66 within the groove 56 is shown in FIGS. 8A-8D, 9, 10A and 10B. The ridges or ribs are indicated by numeral 66 and individually as D0 through D6. The groove 56 may be uniform width circumferentially along the side of the tire 12 with the molded ridges D0 through D6 formed to project into the groove 56 in a preselected sequence, pattern, or array. The ridges D0 through D6 may retain the tube 42 in a predetermined orientation within the groove 56 and also may apply a variable sequential constriction force to the tube.

The uniformly dimensioned pump tube 42 may be positioned within the groove 56 as explained above—a procedure initiated by mechanically spreading the entryway D3 of the groove 56 apart. The tube 42 may then be inserted into the enlarged opening of the groove 56. The opening of the groove 56 may thereafter be released to return to close into the original spacing D3 and thereby capture the tube 42 inside the groove. The longitudinal locking ribs 52, 54 may thus be captured/locked into the longitudinal grooves 60, 62. The locking ribs 52, 54 resultingly operate to lock the tube 42 inside the groove 56 and prevent ejection of the tube from the groove 56 during tire operation/rotation.

Alternatively, the tube 42 may be press inserted into the groove 56. The tube 42, being of uniform width dimensions and geometry, may be manufactured in large quantities. Moreover, a uniform dimensioned pump tube 42 may reduce overall assembly time, material cost, and non-uniformity of tube inventory. From a reliability perspective, this results in less chance for scrap.

The circumferential ridges D0 through D6 projecting into the groove 56 may increase in frequency (number of ridges per axial groove unit of length) toward the inlet passage of the tube 42, represented by the outlet device 70. Each of the ridges D0 through D6 may have a common radius dimension R4 within a range of 0.15 mm to 0.30 mm. The spacing between ridges D0 and D1 may be largest, the spacing between D1 and D2 the next largest, and so on until the spacing between ridges D5 and D6 is nominally eliminated. While seven ridges are shown, more or fewer ridges may be deployed at various frequency along the groove 56.

Figure 9:
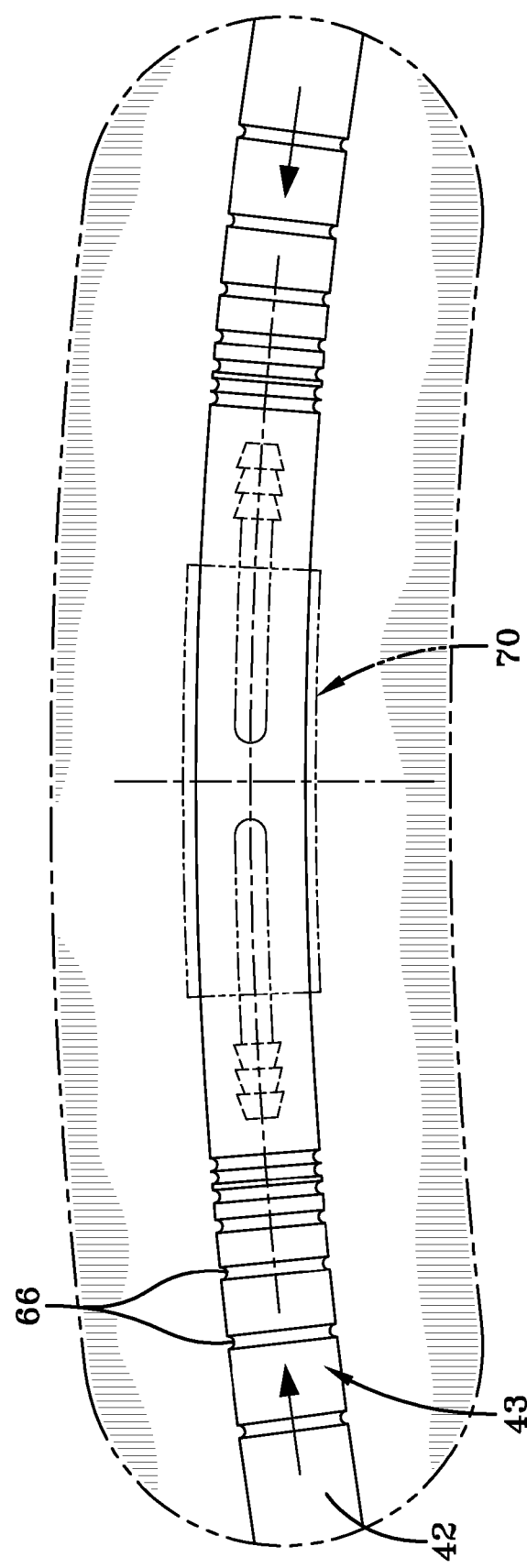
FIG. 9; Enlarged detail taken from FIG. 2 showing an example rib profile area located on both sides of the outlet to a cavity connector.

The projection of the ridges into the groove 56 by radius R4 may serve a twofold purpose. First, the ridges D0 through D6 may engage the tube 42 and prevent the tube from migrating, or "walking", along the groove 56 during tire operation/rotation from the intended location of the tube. Secondly, the ridges D0 through D6 may compress the segment of the tube 42 opposite each ridge to a greater extent as the tire 12 rotates through its rotary pumping cycle, as explained above. The flexing of the sidewall may manifest a compression force through each ridge D0 through D6 and may constrict the tube segment opposite such ridge to a greater extent than otherwise would occur in tube segments opposite non-ridged portions of the groove 56. As seen in FIGS. 10A and 10B, as the frequency of the ridges increases in the direction of air flow, a pinching of the tube passageway 43 may progressively occur until the passageway constricts to the size shown at numeral 136, gradually reducing the air volume and increasing the pressure. As a result, with the presence of the ridges, the groove 56 may provide variable pumping pressure within the tube 42 configured to have a uniform dimension therealong. As such, the sidewall groove 56 may be a variable pressure pump groove functioning to apply a variable pressure to a tube 42 situated within the groove. It will be appreciated that the degree of pumping pressure variation may be determined by the pitch or ridge frequency within the groove 56 and the amplitude of the ridges deployed relative to the diametric dimensions of the tube passageway 43. The greater the ridge amplitude relative to the diameter, the more air volume may be reduced in the tube segment opposite the ridge and pressure increased, and vice versa. FIG. 9 depicts the attachment of the tube 42 to the outlet device 70 and the direction of air flow on both sides into outlet device.

Figure 11:
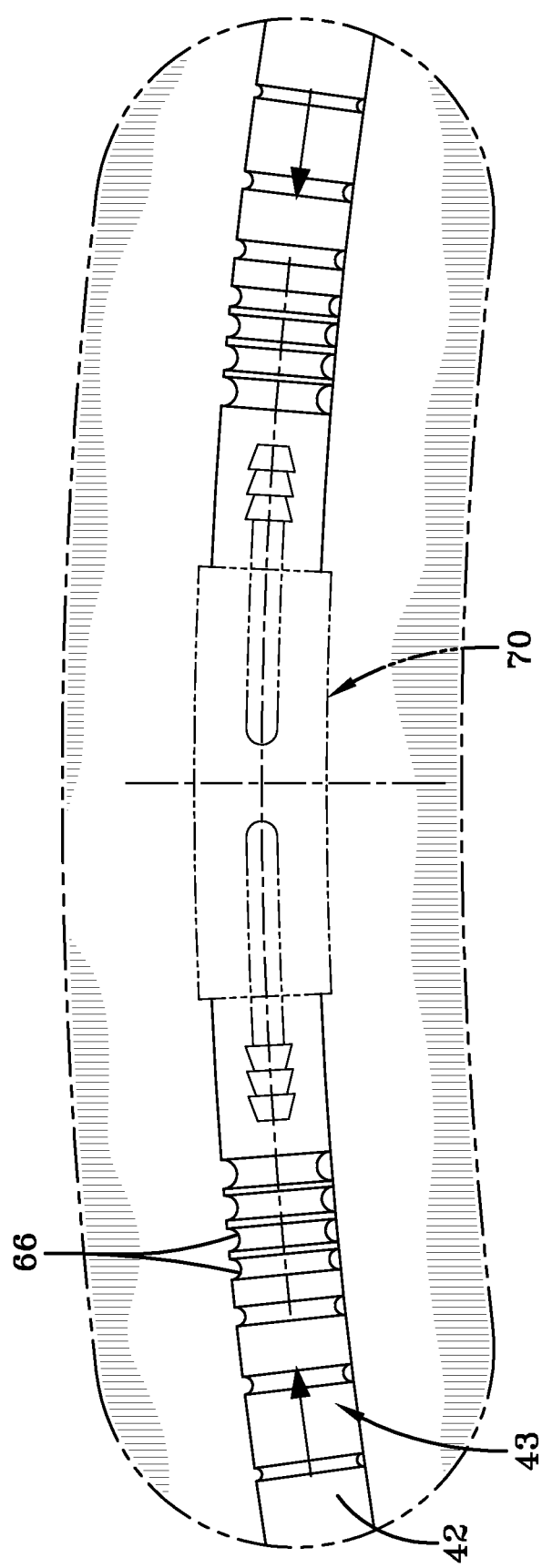
FIG. 11; Enlarged detail taken from FIG. 2 showing another example rib profile area located on both sides of the outlet to a cavity connector.
Figure 12A:
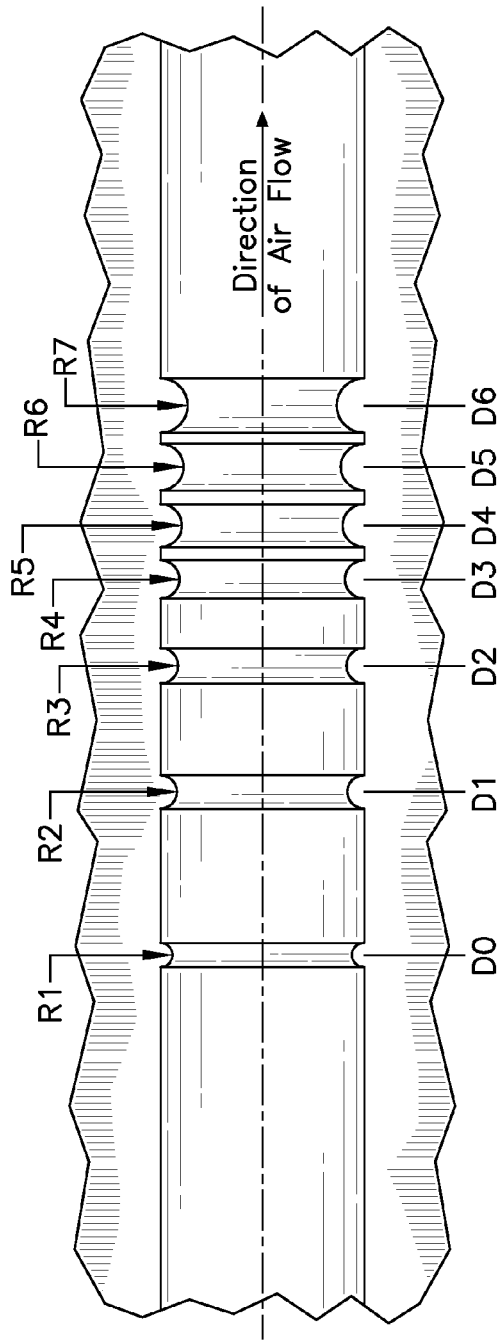
FIG. 12A; Enlarged detail of the groove with the other example rib profile.
Figure 12B:
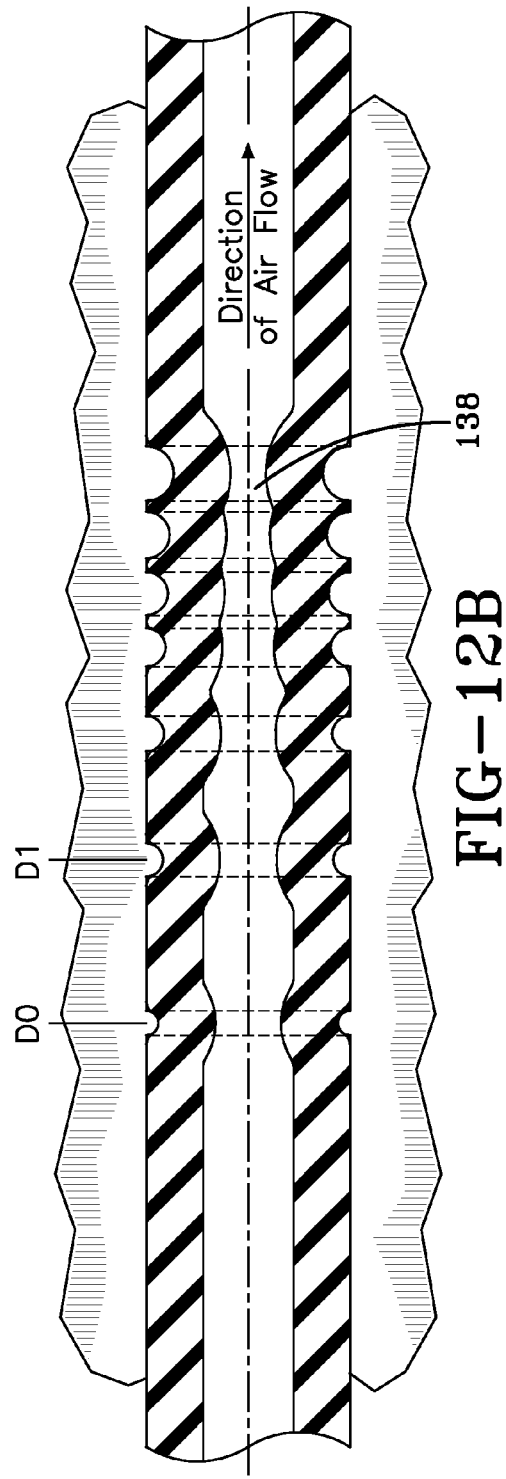
FIG. 12B; Enlarged detail of the tube pressed into the other example rib profile.

FIG. 11 shows a second alternative rib profile area located on both sides of the outlet to the outlet device 70. FIG. 12A shows an enlarged detail of the groove 56 with the alternative second rib profile and FIG. 12B shows an enlarged detail of the tube 42 pressed into the second rib profile. With reference to FIGS. 11, 12A, 12B, the ridges, or ribs, D0 through D6 in this alternative may have a frequency pattern similar to that described above in reference to FIGS. 10A, 10B, but with each rib having a unique respective amplitude as well. Each of the ribs D0 through D6 may generally have a semi-circular cross-section with a respective radius of curvature R1 through R7, respectively. The radii of curvatures of the ridges/D0 through D6 may be within the exemplary range: A=0.020 mm to 0.036 mm.

The number of ridges D0 through D6 and respective radii of each ridge may be constructed outside the above ranges to suit other dimensions or applications. The increasing radius of curvature in the direction of air flow may result in the ridges D0 through D6 projecting at an increasing amplitude and, to an increasing extent, into the passageway 43 toward the outlet device 70. As such, the passageway 43 may constrict to a narrower region 138 toward the outlet device 70 and cause a correspondingly greater increase in air pressure from a reduction in air volume. The benefit of such a configuration is that the tube 42 may be constructed smaller than otherwise necessary in order to achieve a desired air flow pressure along the passageway 43 and into the tire cavity 40 from the outlet device 70. A smaller sized tube 42 may be economically and functionally desirable in allowing a smaller groove 56 within the tire 12 to be used, thereby resulting a minimal structural discontinuity in the tire sidewall.

Figure 13A:
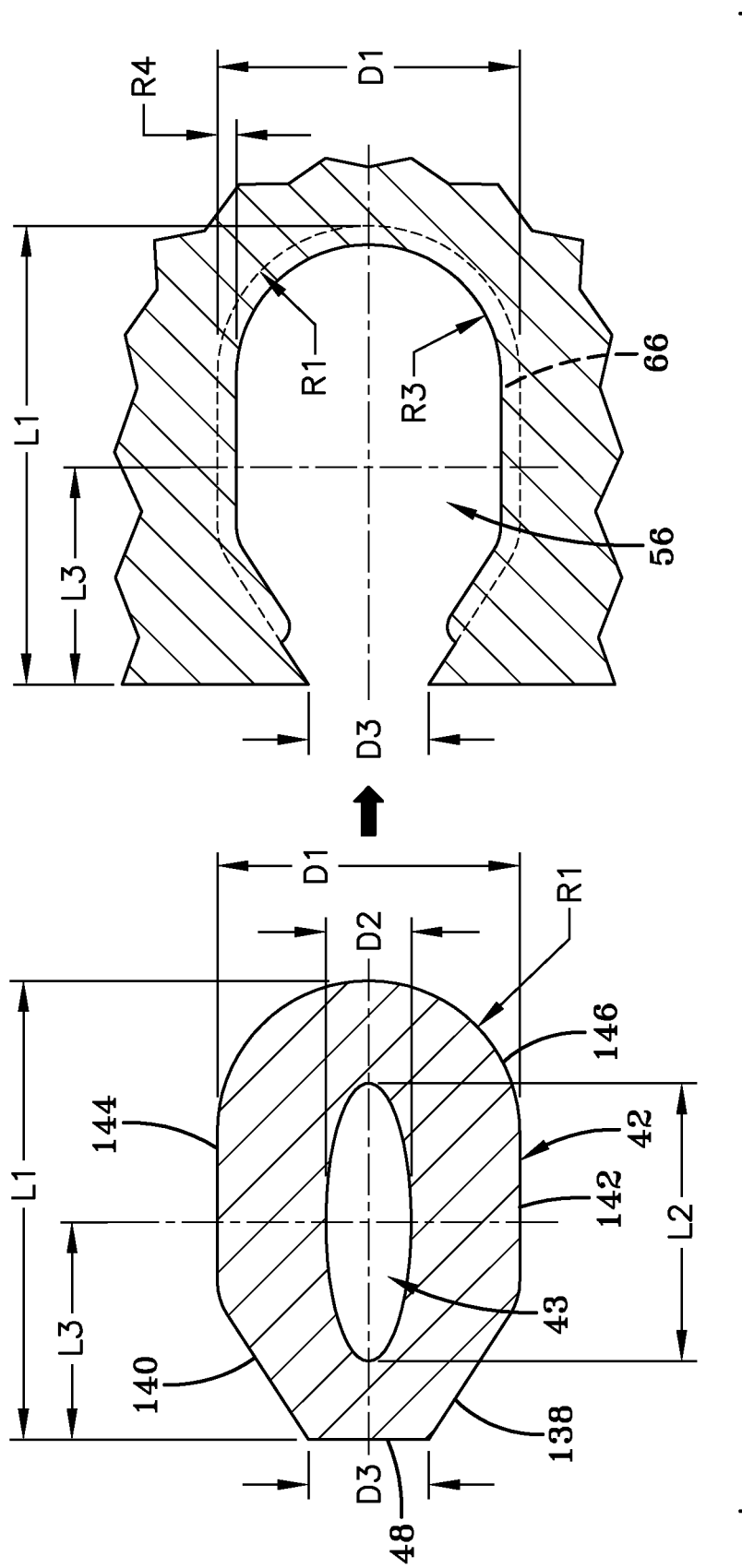
FIG. 13A; Enlarged view of another example tube & groove detail.
Figure 13B:
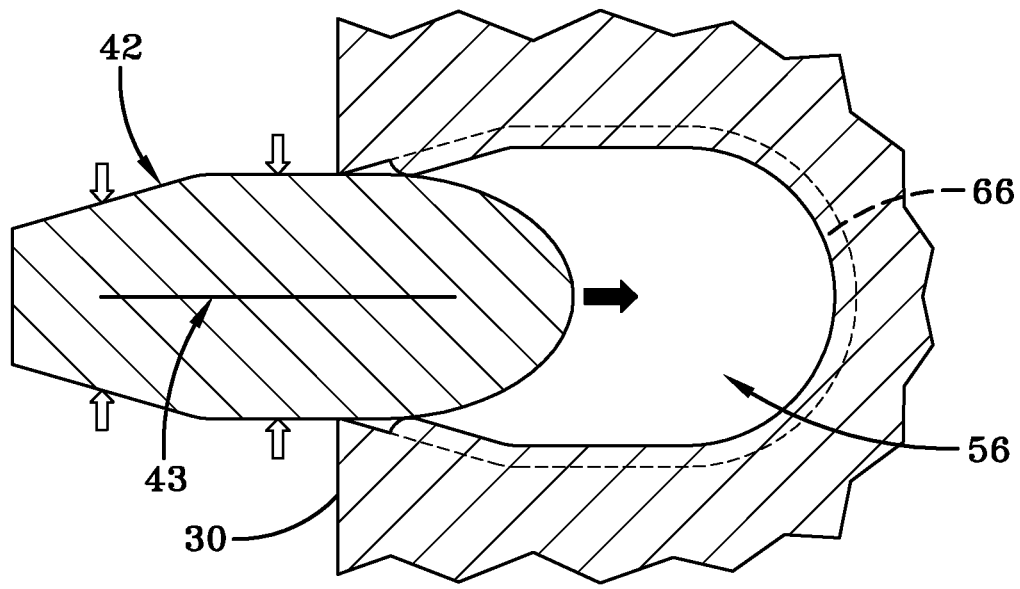
FIG. 13B; Detail showing tube from FIG. 13A being compressed and inserted into the groove.
Figure 13C:
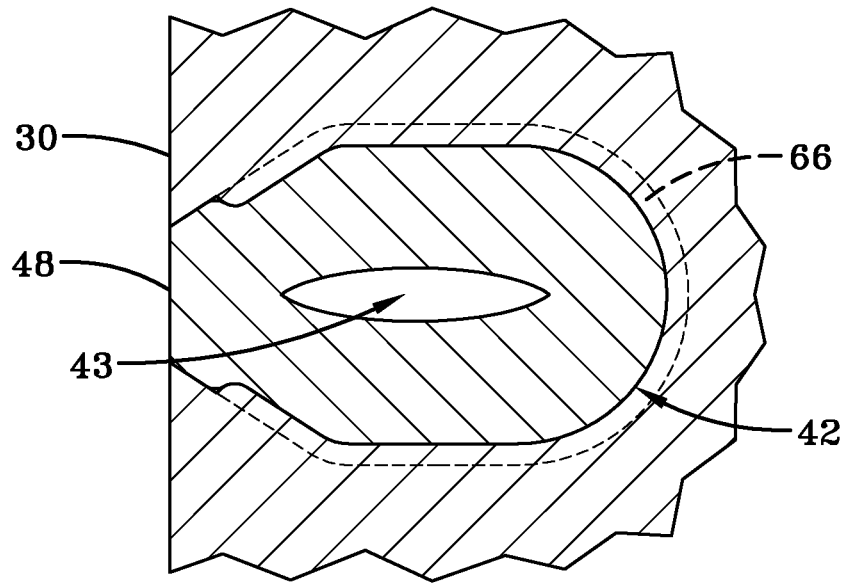
FIG. 13C; Detail showing the tube from FIG. 13A fully inserted into the groove.

FIGS. 13A through 13C show another tube 42 and groove 56 detail in which the detent ribs 90 of FIG. 8A through 8C are eliminated as a result of rib and groove modification. This tube 42 may have an external geometry and passageway configuration with indicated dimensions within ranges specified as follows:
D1=2.2 to 3.8mm;
D2=0.5 to 0.9mm;
D3=0.8 to 1.0mm;
R4=0.15 to 0.30mm;
L1=3.65 to 3.8mm;
L2=2.2 to 2.3mm;
L3=1.8 to 2.0mm The above ranges may be modified to suit a particular dimensional preference, tire geometry, or tire application. The external configuration of the tube 42 may include beveled surfaces 138, 140 adjoining the end surface 48; parallel and opposite straight intermediate surfaces 142, 144 adjoining the beveled surfaces, respectively; and a radiused nose, or forward surface 146, adjoining the intermediate surfaces 142, 144. As seen from FIGS. 13B and 13C, the tube 42 may be compressed for press insertion into the groove 56 and, upon full insertion, expand. The constricted opening of the groove 56 at the sidewall surface may retain the tube 42 securely within the groove 56.

Figure 14A:
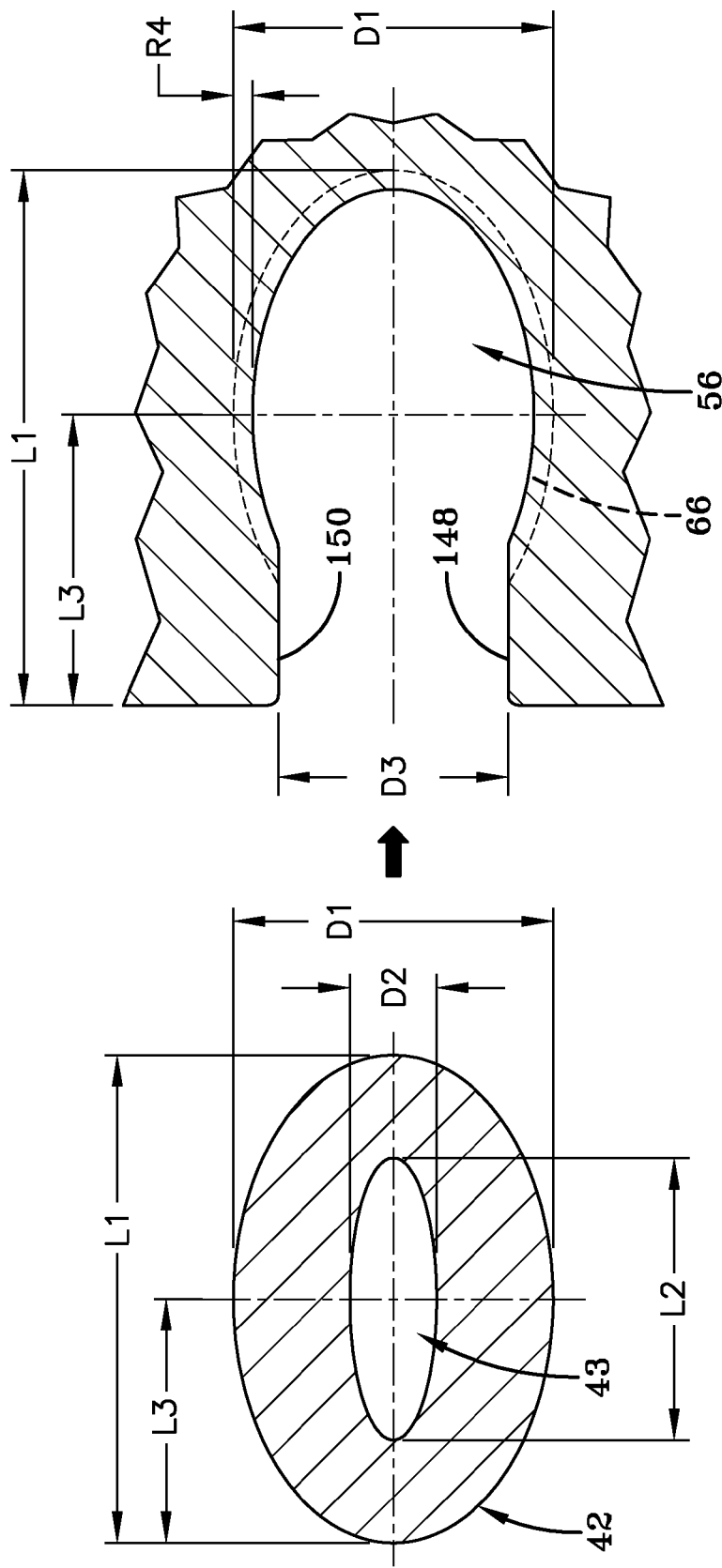
FIG. 14A; Enlarged view of a third example tube & groove detail.
Figure 14B:
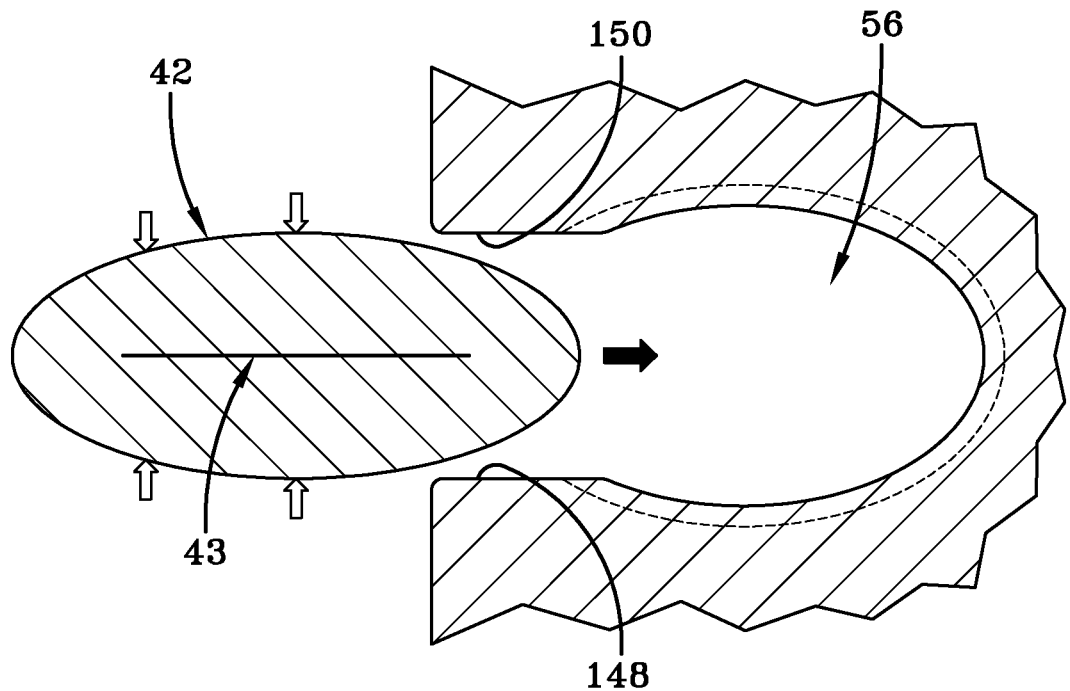
FIG. 14B; Detail showing tube from FIG. 14A being compressed and inserted into the groove.
Figure 14C:
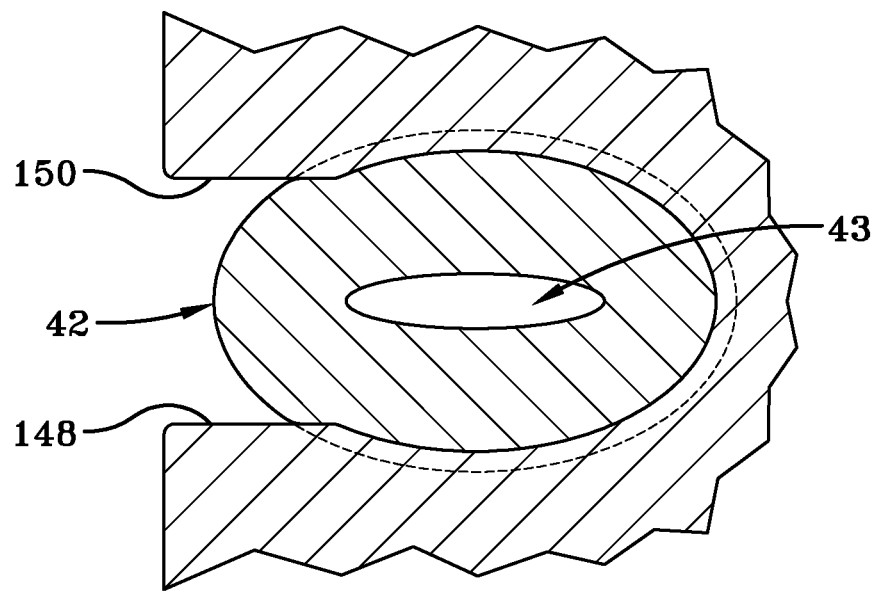
FIG. 14C; Detail showing the tube from FIG. 14A fully inserted into the groove.
Figure 15A:
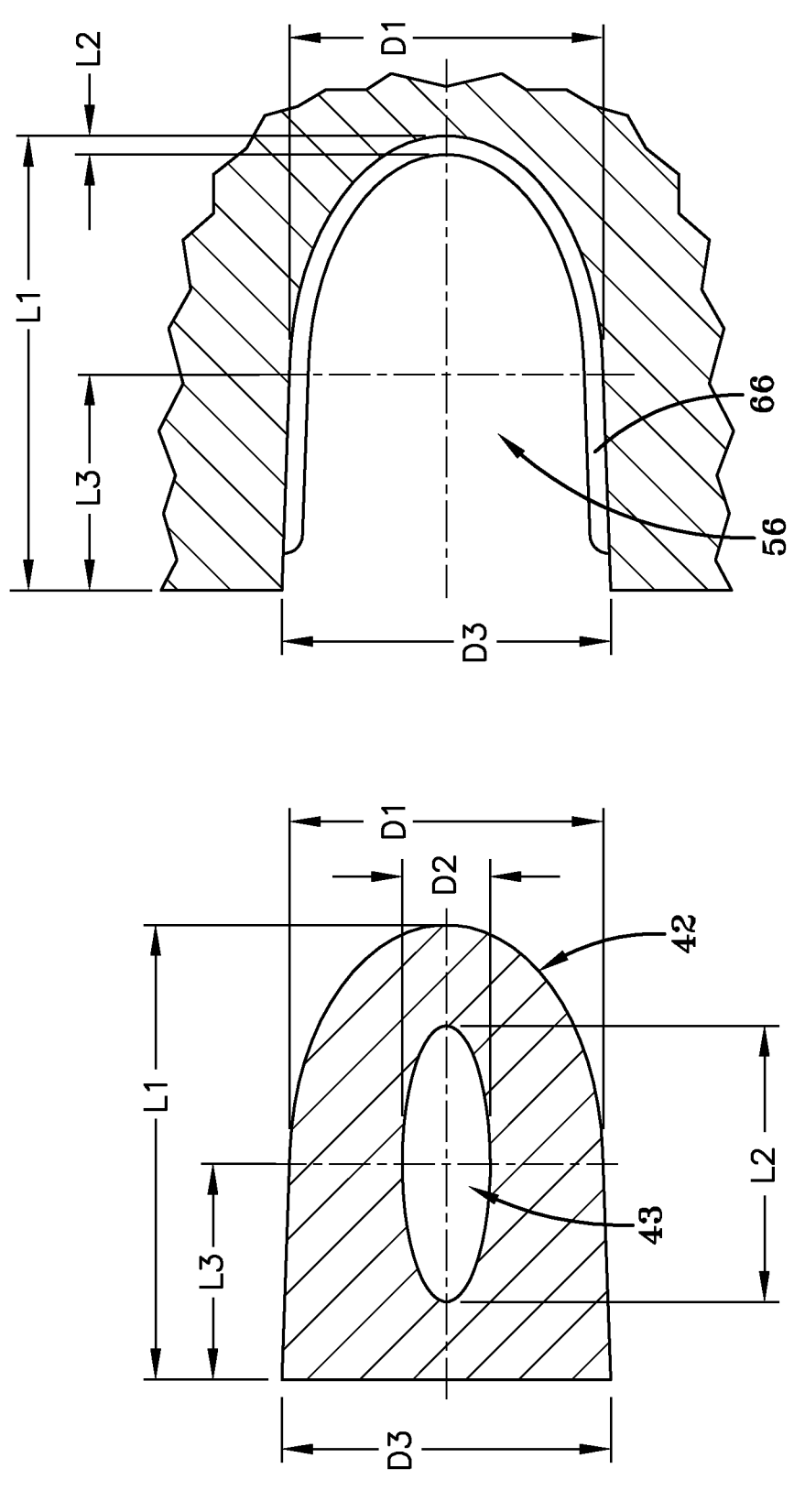
FIG. 15A; Enlarged view of a fourth example tube & groove detail.
Figure 15B:
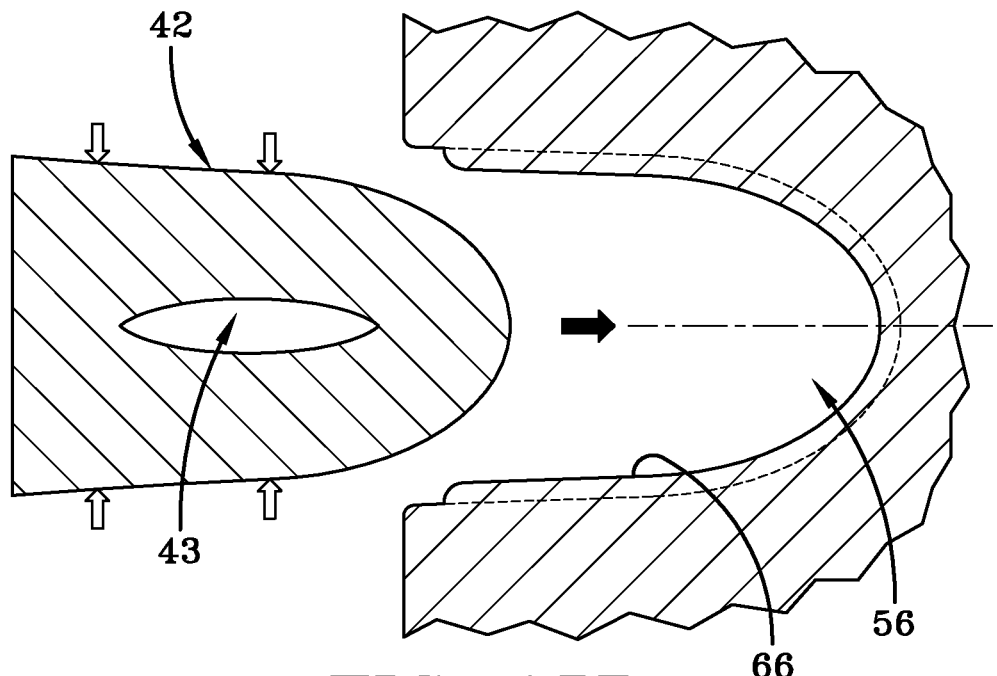
FIG. 15B; Detail showing tube from FIG. 15A being compressed and inserted into the groove.
Figure 15C:
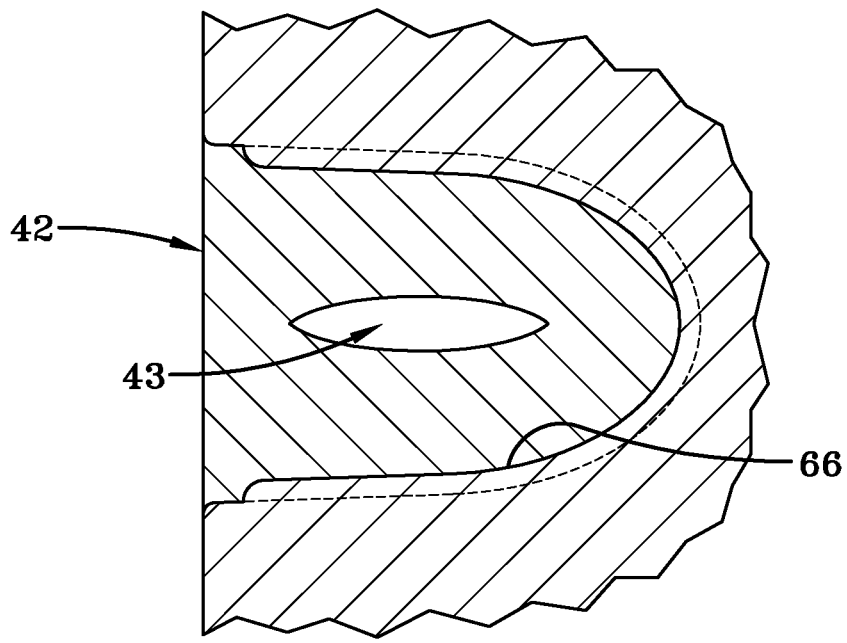
FIG. 15C; Detail showing the tube from FIG. 15A fully inserted into the groove.

FIGS. 14A through 14C show another tube 42 and groove 56 configuration. FIG. 14A is an enlarged view and 14B is a detailed view showing the tube 42 compressed and inserted into the groove 56. FIG. 14C is a detailed view showing the tube 42 fully inserted into the groove 56. The tube 42 may be generally elliptical in cross-section inserting into a like-configured groove 56. The groove 56 may have a narrow entryway formed between opposite parallel surfaces 148, 150. In FIGS. 14A through 14C, the tube 42 is configured having an external geometry and passageway configuration with dimensions within the ranges specified as follows:
D1=2.2 to 3.8mm;
D2=0.5 to 0.9mm;
D3=0.8 to 1.0mm;
R4=0.15 to 0.30mm;
L1=3.65 to 3.8mm;
L2=2.2 to 2.3mm;
L3=1.8 to 2.0mm The above ranges may be modified to suit a particular dimensional preference, tire geometry, or tire application. FIGS. 15A through 15C show another tube 42 and groove 56 configuration. FIG. 15A is an enlarged view and FIG. 15B is a detailed view showing the tube 42 compressed and inserted into the groove 56. FIG. 15C is a detailed view showing the tube 42 fully inserted into the groove 56. The tube 42 may be generally have a parabolic cross-section for inserting into a like-configured groove 56. The groove 56 may have an entryway sized to closely accept the tube 42 therein. The ridges 66 may engage the tube 42 once inserted into the groove 56. In FIGS. 15A through 15C, the tube 42 has an external geometry and passageway configuration with dimensions within the ranges specified as follows:
D1=2.2 to 3.8mm;
D2=0.5 to 0.9mm;
D3=2.5 to 4.1mm;
L1=3.65 to 3.8mm;
L2=2.2 to 2.3mm;
L3=1.8 to 2.0mm The above ranges may be modified to suit a particular dimensional preference, tire geometry, or tire application if desired.

From the forgoing, it will be appreciated that the example assembly may comprise a bi-directionally peristaltic pump assembly 14 for air maintenance of a tire 12. The circular air tube 42 may flatten, segment by segment, and close in the tire footprint 100. The air inlet device 68 may include an outer filter sleeve 92 formed of porous cellular material and thereby render the air inlet device 68 self-cleaning. The outlet device 70 may employ a valve unit (see U.S. Pat. No. 8,381,785, granted Feb. 26, 2013, incorporated herein by reference). The peristaltic pump assembly 14 may pump air through rotation of the tire 12 in either direction, one half of a revolution pumping air to the tire cavity 40 and the other half of a revolution pumping air back out of the inlet device 68. The peristaltic pump assembly 14 may be used with a secondary tire pressure monitoring system (TPMS) (not shown) that may serve as a system fault detector. The TPMS may be used to detect any fault in the self-inflation system of the tire assembly 10 and alert the user of such a condition.

The tire air maintenance system 10 may further incorporate a variable pressure pump groove 56 with one or more inwardly directed ridges or ribs 66 engaging and compressing a segment of the air tube 42 opposite such rib(s). The pitch or frequency of the ribs may increase toward the outlet device 70 for gradually reducing air volume within the passageway 43 by compressing the tube 42. The reduction in air volume may increase air pressure within the passageway 43 and thereby facilitate a more efficient air flow from the tube 42 into the tire cavity 40. The increase in tube pressure may be achieved by engagement by the ribs 66 of the groove 56 and the tube 42 having uniform dimensions along the tube length. The tube 42 may thus be made of uniform dimension and of relatively smaller size without compromising the flow pressure of air to the tire cavity 40 for maintaining air pressure. The pitch and amplitude of the ridges 66 may both be varied to better achieve the desired pressure increase within the passageway 43.

Figure 1:
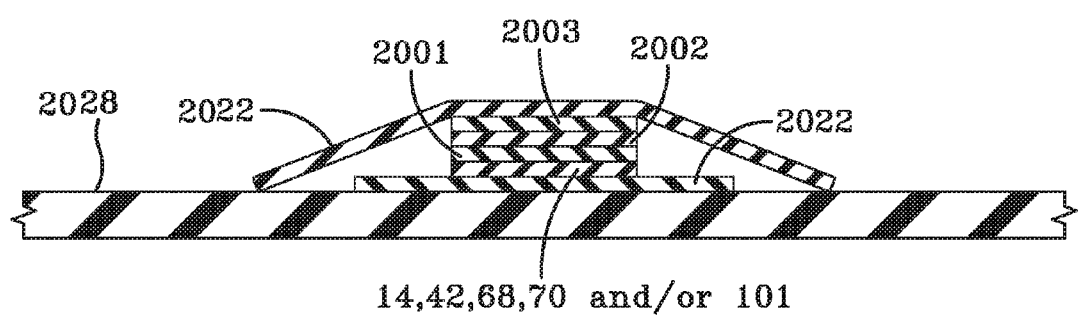
FIG. 1; Schematic cross-sectional view of an example assembly in accordance with the present invention.

Structures in a pneumatic tire may require the embedding of certain rigid parts, functional devices, and/or connectors into adhering onto the rubber of the tire. For example, the structures 14, 42, 68, 70, 101, etc. of the example air maintenance tire 12 described above may require embedding/adherence. Such structures 14, 42, 68, 70, 101, etc. typically encounter high stresses during operating conditions of the tire 10. Thus, strong bonding of such structures 14, 42, 68, 70, 101, etc. is desired since a bond break at the structure's 14, 42, 68, 70, 101, etc. surface will likely lead to destruction of the assembly 14 and/or the integrity of the tire 12 as a whole. A subcoat 2001 may be applied to a bare surface of the structures 14, 42, 68, 70, 101 and a topcoat 2002 may be applied to the subcoat. Further, a compound cement 2003 may be applied to the topcoat 2002 (FIG. 1). The subcoat 2001 may be dried to the bare surface of the structures 14, 42, 68, 70, 101 at 180° C. for 8 min.

For example, an ultra high molecular weight polyethylene (UHMWPE) elbow-like structure 70 may be bonded to a tire 12 in order to define a built-in tube-like cavity (FIG. 3C). This structure 70 may thereby allow rerouting of pressurized air to a pump assembly 14 and from there, into a tire cavity 40, as well as to make a connection to the outside for providing fresh unpressurized air to the pump assembly.

In order to optimally bond such structures 14, 42, 68, 70, 101, etc. to a tire 12, UHMWPE structures 14, 42, 68, 70, 101, etc. may be used. UHMWPE is similar to standard polyethylene, but has viscous flow shifted to significantly higher temperatures due to the much higher molecular weight and/or chain length. Thus, UHMWPE may bond at its surface to rubber at elevated temperatures through polymer chain entanglement, without losing its initial shape. The UHMWPE structures 14, 42, 68, 70, 101, as well as any other build-in connectors inserts, and rigid parts, may be pressure sintered and machined from bulk and bonded to the tire 12. This bonding may reduce complexity and cost.

An example UHMWPE structure 14, 42, 68, 70, 101, etc. in accordance with the present invention is shown in cross-section in FIG. 1, with a plurality of layers of tape 2022 disposed on a surface 2028. The layers 2022 may be stacked and overlapped in such a manner as to form a desired bond strength. The layers of tape 2022 may be fused by application of heat during cure of a tire 12, or by action of an adhesive applied to tape 2022. With the present method, the relatively thin tape 2022 allows easy handling and application of the thermoplastic during tire building without need for thermal softening.

Suitable thermoplastic materials for use as the tape 2022 may include polyolefin such as polyethylene and polypropylene; polyamides such as nylon 6, nylon 6,6; nylon 6,12; polyesters such as polyethylene terephthalate (PET) and polybutylene terephthalate (PBT); polyphenylene ether (PPE); polyphthalamide (PPA); and the like. Suitable thermoplastic materials may have a melting temperature greater than the temperatures experienced during operating conditions of the tire 12. The thermoplastic material may have a melting temperature greater than 160° C. or a melting temperature greater than 130° C. The thermoplastic material may be treated on its surface with an adhesive to promote adhesion between the layers of tape 2022 and the adhesion between the tape 2022 and the adjacent UHMWPE structures 14, 42, 68, 70, 101, etc.

The tape 2022 may be dipped in an RFL (resorcinol-formaldehyde-latex) type adhesive, an epoxy-based adhesive, and/or a combination of RFL and epoxy-based adhesives. The adhesive, if used, may then be disposed between the layers of tape 2022 in the UHMWPE structure 14, 42, 68, 70, 101, etc.

Other components of the tire 12 may be made from rubber compositions with rubbers or elastomers containing olefinic unsaturation. The phrase "rubber or elastomer containing olefinic unsaturation" is intended to include both natural rubber and its various raw and reclaim forms, as well as various synthetic rubbers. The terms "rubber" and "elastomer" may be used interchangeably, unless otherwise prescribed. The terms "rubber composition," "compounded rubber," and "rubber compound" may be used interchangeably to refer to rubber that has been blended and/or mixed with various ingredients and materials and such terms are well known to those having skill in the rubber mixing or rubber compounding art.

Representative synthetic polymers may be the homopolymerization products of butadiene and its homologues and derivatives, for example, methylbutadiene, dimethylbutadiene and pentadiene, as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones, and ethers (e.g., acrolein, methyl isopropenyl ketone, and/or vinylethyl ether). Specific examples of synthetic rubbers may include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile, and/or methyl methacrylate, as well as ethylene/propylene terpolymers (also known as ethylene/propylene/diene monomer (EPDM)), and/or ethylene/propylene/dicyclopentadiene terpolymers. Additional examples of rubbers which may be used include alkoxy-silyl end functionalized solution polymerized polymers (SBR, PBR, IBR, and/or SIBR), silicon-coupled and tin-coupled star-branched polymers. Rubber and/or elastomers may be polybutadiene and SBR.

The rubber may be at least two diene based rubbers. For example, a combination of two or more rubbers may be cis 1,4-polyisoprene rubber (natural or synthetic), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers. An emulsion polymerization derived styrene/butadiene (E-SBR) may be used having a styrene content of about 20% to about 28% bound styrene or, for some applications, an E-SBR having a medium to relatively high bound styrene content (e.g., a bound styrene content of about 30% to about 45%).

Emulsion polymerization prepared E-SBR, may be styrene and 1,3-butadiene copolymerized as an aqueous emulsion. The bound styrene content may vary, for example, from about 5% to about 50%. E-SBR may also contain acrylonitrile to form a terpolymer rubber, as E-SBAR, in amounts, for example, of about 2 weight % to about 30 weight % bound acrylonitrile in the terpolymer. Emulsion polymerization prepared styrene/butadiene/acrylonitrile copolymer rubbers may contain about 2 weight % to about 40 weight % bound acrylonitrile in the copolymer, and may be diene based rubbers.

The solution polymerization prepared SBR (S-SBR) may have a bound styrene content in a range of about 5% to about 50%, or about 9% to about 36%. The S-SBR may be prepared, for example, by organo lithium catalyzation in the presence of an organic hydrocarbon solvent. Cis 1,4-polybutadiene rubber (BR) may be used and prepared, for example, by organic solution polymerization of 1,3-butadiene. The BR may be characterized, for example, by having at least a 90% cis 1,4-content.

The term "phr" as used herein, may refer to "parts by weight of a respective material per 100 parts by weight of rubber or elastomer." The term "rubber composition" may also include up to 70 phr of processing oil. Processing oil may be included in the rubber composition as extending oil used to extend elastomers. Processing oil may also be included in the rubber composition by addition of the oil directly during rubber compounding. The processing oil may include both extending oil present in the elastomers and process oil added during compounding. Suitable process oils may include aromatic, paraffinic, napthenic, vegetable oils, and low PCA oils, such as MES, TDAE, SRAE and heavy naphthenic oils.

Suitable low PCA oils may include those having a polycyclic aromatic content of less than 3% by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

The phrase "rubber or elastomer containing olefinic unsaturation" may include both natural rubber and its various raw and reclaim forms, as well as various synthetic rubbers. The terms "rubber" and "elastomer" may be used interchangeably, unless otherwise prescribed. The terms "rubber composition," "compounded rubber" and "rubber compound" may be used interchangeably to refer to rubber which has been blended or mixed with various ingredients and materials. A vulcanizable rubber composition may include from about 10 phr to about 150 phr of silica.

The siliceous pigments of the rubber compound may include pyrogenic and precipitated siliceous pigments (silica). Precipitated silica may be used. Further, the siliceous pigments may be precipitated silicas such as, for example, those obtained by the acidification of a soluble silicate (e.g., sodium silicate). Silicas may be characterized, for example, by having a BET surface area, as measured using nitrogen gas. The BET surface area may be in the range of about 40 $m^2/g$ to about 600 $m^2/g$. The BET surface area may also be in a range of about 80 $m^2/g$ to about 300 $m^2/g$. The BET method of measuring surface area is described in the *Journal of the American Chemical Society*, Volume 60, Page 304 (1930).

Silica may also be characterized by having a dibutylphthalate (DBP) absorption value in a range of about 100 to about 400, or about 150 to about 300. Silica may have an average ultimate particle size, for example, in the range of 0.01 micron to 0.05 micron, as determined by the electron microscope. However, silica particles may be smaller or possibly larger in size.

Various silicas may be used, such as, only for example herein and without limitation, silicas available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from 1 phr to 100 phr of carbon black, crosslinked particulate polymer gel, ultra high molecular weight polyethylene (UHM-WPE) and/or plasticized starch. Carbon black may be used as a filler. Examples of such carbon blacks may include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990, and/or N991. These carbon blacks may have iodine absorptions ranging from 9 g/kg to 145 g/kg and DBP number ranging from 34 $cm^3/100$ g to 150 $cm^3/100$ g.

Other fillers may be used in the rubber composition including, but not limited to, particulate fillers including UHM-WPE, particulate polymer gels including, but not limited to, those disclosed in U.S. Pat. Nos. 6,242,534; 6,207,757; 6,133,364; 6,372,857; 5,395,891; and/or 6,127,488, and plasticized starch composite filler including, but not limited to, that disclosed in U.S. Pat. No. 5,672,639.

It may be understood by those having skill in the art that the rubber composition would be compounded by methods known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. Depending on the intended use of the sulfur vulcanizable and sulfur-vulcanized material (rubbers), the additives may be selected and used in suitable amounts. Examples of sulfur donors may include elemental sulfur (free sulfur), an amine disulfide, polymeric polysulfide, and/or sulfur olefin adducts. The sulfur-vulcanizing agent may be elemental sulfur. The sulfur-vulcanizing agent may be used in an amount ranging from 0.5 phr to 8.0 phr, or with a range of from 1.5 phr to 6.0 phr.

Amounts of tackifier resins, if used, may comprise about 0.5 phr to about 10.0 phr, or about 1.0 phr to about 5.0 phr. Amounts of processing aids may comprise about 1.0 phr to about 50.0 phr. Amounts of antioxidants may comprise about 1.0 phr to about 5.0 phr. Antioxidants may be, for example, diphenyl-p-phenylenediamine and others, such as, for example, those disclosed in *The Vanderbilt Rubber Handbol* (1978), pages 344 through 346. Typical amounts of antiozonants may comprise about 1.0 phr to 5.0 phr. Amounts of fatty acids, if used, may include stearic acid comprising about 0.5 phr to about 3.0 phr. Amounts of zinc oxide may comprise about 2.0 phr to about 5.0 phr. Amounts of waxes may comprise about 1.0 phr to about 5.0 phr, such as microcrystalline waxes. Amounts of peptizers may comprise about 0.1 phr to about 1.0 phr. Peptizers may be, for example, pentachlorothiophenol and dibenzamidodiphenyl disulfide.

Accelerators may control the time and/or temperature required for vulcanization and improve properties of the vulcanizate. A single accelerator system may be used (e.g., primary accelerator). The primary accelerator may be used in total amounts ranging from about 0.5 phr to about 4.0 phr, or about 0.8 phr to about 1.5 phr. Combinations of a primary and a secondary accelerator may be used with the secondary accelerator being used in smaller amounts, such as from about 0.05 phr to about 3.00 phr, in order to activate and improve the properties of the vulcanizate. Combinations of these accelerators may produce a synergistic effect on the final properties somewhat better than those produced by use of either accelerator alone. In addition, delayed action accelerators may be used that are not affected by normal processing temperatures, but produce a satisfactory cure at ordinary vulcanization temperatures. Vulcanization retarders may also be used. Suitable types of accelerators may be amines, disulfides, guanidines, thioureas, thiazoles, thiurams, sulfenamides, dithiocarbamates, and/or xanthates. In one example, the primary accelerator may be a sulfonamide and the secondary accelerator may be a guanidine, dithiocarbamate, and/or thiuram compound.

As an example, ingredients may be mixed in at least two stages: at least one non-productive stage followed by a productive mix stage. The final curatives, including sulfur-vulcanizing agents, may be mixed in the final stage, which is conventionally called the "productive" mix stage in which the mixing occurs at a temperature, or ultimate temperature, lower than the mix temperature and preceding non-productive mix stages. The rubber composition may also be subjected to a thermomechanical mixing step. The thermomechanical mixing step may comprise a mechanical working in a mixer or extruder for a period of time suitable in order to produce a rubber temperature between 140° C. and 190° C. The appropriate duration of the thermomechanical working may vary as a function of the operating conditions, and the volume and nature of the components. For example, the thermomechanical working may be from 1 min. to 20 min.

The rubber composition may be incorporated in a variety of rubber components of the tire 12. For example, the rubber component may be a tread (including tread cap and tread base), sidewall, apex, chafer, sidewall insert, wirecoat, and/or innerliner. Vulcanization of the tire 12 may be carried out at temperatures ranging from about 100° C. to about 200° C. In one example, the vulcanization is conducted at temperatures ranging from about 110° C. to about 180° C. Any vulcanization processes may be used, such as heating in a press or mold, heating with superheated steam or hot air, etc. Such a tire 12 may be built, shaped, molded, and/or cured by various methods.

Variations in the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described which will be within the full intended scope of the present invention as defined by the following appended claims.

What is claimed is:

1. A pneumatic tire assembly comprising:
    a tire having a pneumatic cavity;
    a rigid structure for facilitating operation of the tire assembly, the rigid structure being bonded to the tire by a layered thermoplastic material such that a stiffness gradient is created between the structure and the tire, a subcoat being applied to a bare surface of the rigid structure and a topcoat being applied to the subcoat;
    first and second sidewalls extending respectively from first and second tire bead regions to a tire tread region, the first sidewall having at least one bending region operatively bending when radially within a rolling tire footprint; and
    a sidewall groove defined by groove walls positioned within the bending region of the first tire sidewall, the sidewall groove deforming segment by segment between a non-deformed state and a deformed, constricted state in response to bending of the bending region of the first sidewall while radially within the rolling tire footprint,
    an air passageway is defined by the sidewall groove and deforms segment by segment between an expanded condition and an at least partially collapsed condition in response to respective segment by segment deformation of the sidewall groove when radially within the rolling tire footprint.

2. The pneumatic tire assembly as set forth in claim 1 wherein the thermoplastic material is selected from the group consisting of polyethylene, polypropylene, polyamide, polyester, polyphenylene ether, and polyphthalamide.

3. The pneumatic tire assembly as set forth in claim 1 wherein the thermoplastic material is polyethylene.

4. The pneumatic tire assembly as set forth in claim 1 wherein the thermoplastic material comprises a plurality of thermoplastic layers.

5. The pneumatic tire assembly as set forth in claim 1 wherein the thermoplastic material comprises a plurality of thermoplastic layers, wherein the thermoplastic layers have a layer thickness ranging from 0.1 to 1 mm.

6. The pneumatic tire assembly as set forth in claim 1 wherein the thermoplastic material comprises at least ten thermoplastic layers.

7. The pneumatic tire assembly as set forth in claim 1 wherein the thermoplastic material comprises a plurality of thermoplastic layers with an adhesive disposed between the thermoplastic layers.

8. The pneumatic tire assembly as set forth in claim 1 wherein the thermoplastic material comprises at least ten thermoplastic layers with an adhesive disposed between the thermoplastic layers.

9. The pneumatic tire assembly as set forth in claim 1 wherein the rigid structure is constructed of ultra high molecular weight polyethylene.

10. The pneumatic tire assembly as set forth in claim 1 wherein the rigid structure and the tire define a built-in tube-like cavity.

11. The pneumatic tire assembly as set forth in claim 1 further including a separate tube disposed within the sidewall groove, the separate tube defining a circular air passageway.

12. The pneumatic tire assembly as set forth in claim 11 wherein the separate tube has an outer profile corresponding to an inner profile of the sidewall groove.

13. The pneumatic tire assembly as set forth in claim 1 wherein a compound cement is applied to the topcoat.

14. The pneumatic tire assembly as set forth in claim 13 wherein the subcoat is dried to the bare surface of the rigid structure at 180° C. for 8 min.

* * * * *